United States Patent
Shibasaki et al.

(10) Patent No.: US 12,197,732 B2
(45) Date of Patent: Jan. 14, 2025

(54) MEMORY SYSTEM

(71) Applicant: KIOXIA CORPORATION, Tokyo (JP)

(72) Inventors: Kenta Shibasaki, Kamakura Kanagawa (JP); Yoshihiko Shindo, Fujisawa Kanagawa (JP); Yasuhiro Hirashima, Kawasaki Kanagawa (JP); Akio Sugahara, Yokohama Kanagawa (JP); Shigeki Nagasaka, Kawasaki Kanagawa (JP); Dai Nakamura, Fujisawa Kanagawa (JP); Yousuke Hagiwara, Kawasaki Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/898,370

(22) Filed: Aug. 29, 2022

(65) Prior Publication Data
US 2023/0297239 A1 Sep. 21, 2023

(30) Foreign Application Priority Data
Mar. 16, 2022 (JP) ................. 2022-041389

(51) Int. Cl.
*G06F 3/06* (2006.01)
(52) U.S. Cl.
CPC .......... *G06F 3/0613* (2013.01); *G06F 3/0653* (2013.01); *G06F 3/0679* (2013.01)
(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS

| | | | |
|---|---|---|---|
| 7,328,223 B2* | 2/2008 | Nakamichi | H04L 67/1097 |
| 8,010,752 B2* | 8/2011 | Shin | G06F 3/0658 |
| | | | 711/115 |
| 10,416,903 B2* | 9/2019 | Fackenthal | G06F 3/0665 |
| 10,803,970 B2* | 10/2020 | Schuh | G11C 29/08 |

(Continued)

FOREIGN PATENT DOCUMENTS

| | | |
|---|---|---|
| JP | 2018-067072 A | 4/2018 |
| TW | I349289 B | 9/2011 |
| TW | I748356 B | 12/2021 |

OTHER PUBLICATIONS

Cold Boot definition; Margaret Rouse, Techopedia; Mar. 16, 2016; retrieved from https://www.techopedia.com/definition/3332/cold-boot on Oct. 24, 2023 (Year: 2016).*

*Primary Examiner* — Daniel C. Chappell
(74) *Attorney, Agent, or Firm* — Kim & Stewart LLP

(57) ABSTRACT

A memory system includes a memory chip and a memory controller. The memory chip includes a storage region that stores setup data used for setup of the memory chip during power on thereof. The memory controller is configured to determine whether or not the memory controller has the setup data, when determining that the memory controller does not have the setup data, instruct the memory chip to read the setup data from the storage region and perform a first setup operation based on the read setup data, and when determining that the memory controller has the setup data, transmit the setup data to the memory chip and instruct the memory chip to perform a second setup operation based on the setup data received from the memory controller.

17 Claims, 23 Drawing Sheets

(58) Field of Classification Search
CPC ............... G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825; G06F 16/00–986; G06F 18/00–41; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06N 3/00–126; G06N 5/00–048; G06N 7/00–08; G06N 10/00; G06N 20/00–20; G06N 99/00–007; G06T 1/00–60; G06V 30/00–43; G11B 20/00–24; G11B 33/00–1493; G11C 11/00–5692; G11C 13/00–06; G11C 14/00–009; G11C 15/00–06; G11C 16/00–3495; G11C 17/00–18; G11C 2207/00–229; G11C 2216/00–30; H01L 25/00–50; H01L 2225/00–1094; H03M 7/00–707; H04L 9/00–38; H04L 12/00–66; H04L 41/00–5096; H04L 49/00–9094; H04L 61/00–59; H04L 67/00–75

See application file for complete search history.

(56) References Cited

U.S. PATENT DOCUMENTS

| | | | |
|---|---|---|---|
| 2003/0041203 A1 | 2/2003 | Jones et al. | |
| 2005/0144609 A1* | 6/2005 | Rothman | ................... G06F 8/65 714/E11.135 |
| 2006/0277524 A1* | 12/2006 | Goodman | ........... G06F 11/1433 717/106 |
| 2008/0028131 A1* | 1/2008 | Kudo | ..................... G11C 16/10 711/103 |
| 2008/0162839 A1* | 7/2008 | Nakamichi | ........... G06F 3/0665 711/159 |
| 2009/0193183 A1 | 7/2009 | Kudo et al. | |
| 2016/0011973 A1* | 1/2016 | Zerbe | .................... G06F 13/364 711/103 |
| 2016/0293274 A1* | 10/2016 | Schuh | .................... G11C 29/16 |
| 2017/0131853 A1* | 5/2017 | Keller | .................... G06F 3/0653 |
| 2018/0107413 A1* | 4/2018 | Suzuki | .................. G06F 3/0658 |
| 2021/0064258 A1 | 3/2021 | Sakurai et al. | |
| 2023/0140995 A1* | 5/2023 | Park | ....................... G11C 5/147 711/103 |

* cited by examiner

MEMORY SYSTEM

CROSS-REFERENCE TO RELATED APPLICATION(S)

This application is based upon and claims the benefit of priority from Japanese Patent Application No. 2022-041389, filed Mar. 16, 2022, the entire contents of which are incorporated herein by reference.

FIELD

Embodiments described herein relate generally to a memory system.

BACKGROUND

As a memory system, a solid state drive (SSD) equipped with a non-volatile memory device such as a NAND type flash memory is known.

DETAILED DESCRIPTION

Figure 1:
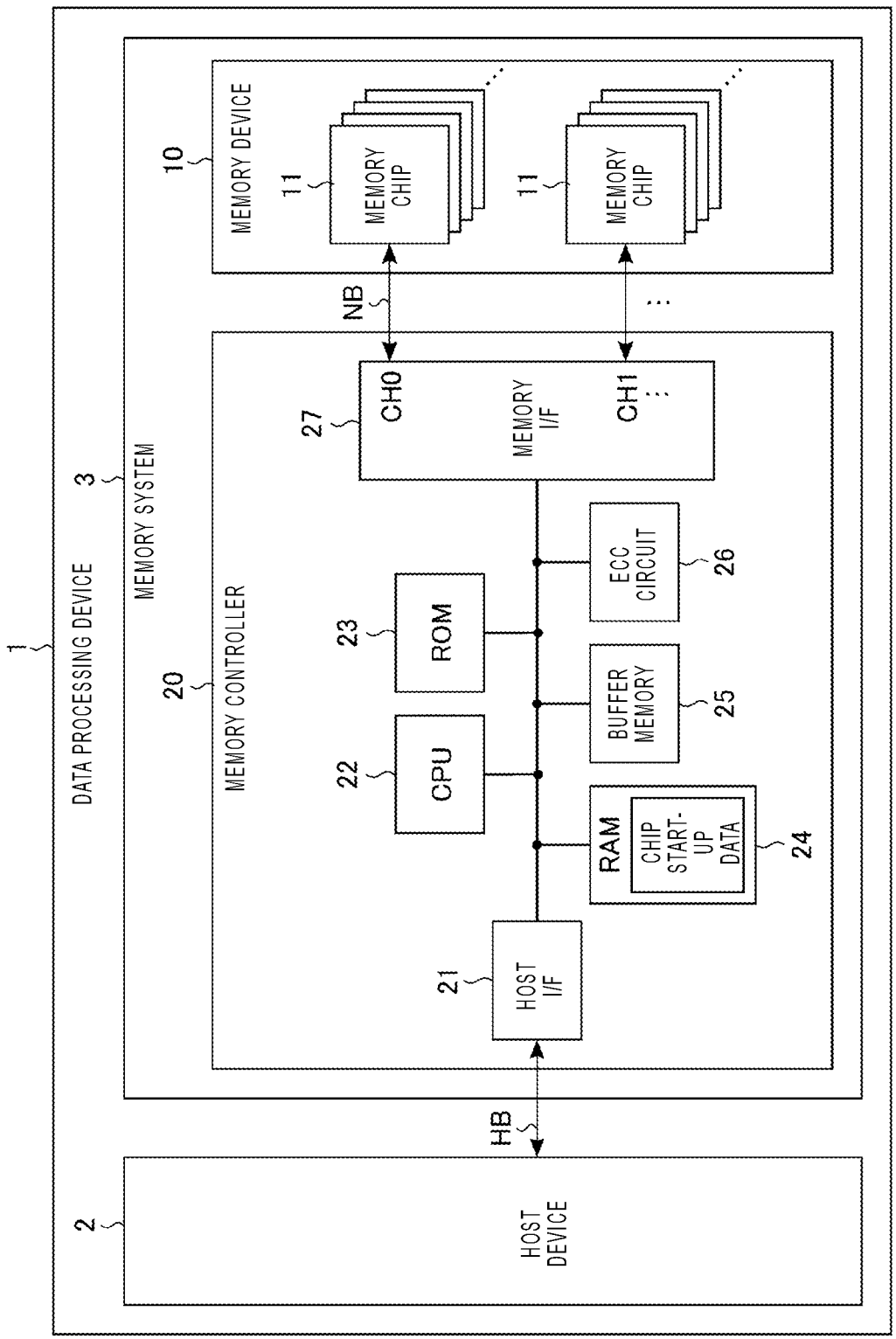
FIG. 1 is a block diagram illustrating an example of an overall configuration of a data processing device including a memory system according to a first embodiment.

Embodiments provide a memory system capable with improved processing capability.

In general, according to an embodiment, a memory system includes a memory chip and a memory controller. The memory chip includes a storage region that stores setup data used for setup of the memory chip during power on thereof. The memory controller is configured to determine whether or not the memory controller has the setup data, when determining that the memory controller does not have the setup data, instruct the memory chip to read the setup data from the storage region and perform a first setup operation based on the read setup data, and when determining that the memory controller has the setup data, transmit the setup data to the memory chip and instruct the memory chip to perform a second setup operation based on the setup data received from the memory controller.

Hereinafter, an embodiment will be described with reference to drawings. The drawings are schematic. In the following description, the same reference numerals refer to components having substantially the same function and configuration. Numbers after characters that constitute a reference numeral are referenced by the reference numeral containing the same character, and are used to distinguish elements with the same configuration. When it is not necessary to distinguish the element represented by the reference numerals including the character form each other, the element is referenced by the reference numeral having only the same character.

Hereinafter, a memory system according to one or more embodiments will be described.

1. First Embodiment

1.1. Configuration of Information Processing Device

1.1.1. Configuration of Data Processing Device

First, referring to FIG. 1, an example of a configuration of a data processing device 1 including the memory system will be described. FIG. 1 is a block diagram illustrating an example of an overall configuration of the data processing device 1.

As illustrated in FIG. 1, the data processing device 1 includes a host device 2 and a memory system 3. The data processing device 1 may include a plurality of host devices 2 or a plurality of memory systems 3. When the data processing device 1 includes the plurality of host devices 2 and the plurality of memory systems 3, the plurality of memory systems 3 may be connected to one host device 2. Further, the plurality of host devices 2 may be connected to one memory system 3.

The host device 2 is an information processing device (i.e., computing device) that accesses the memory system 3. The host device 2 controls the memory system 3. More specifically, for example, the host device 2 requests (or instructs) a writing operation or a reading operation of data (hereinafter, referred to as "user data") to the memory system 3.

The memory system 3 is, for example, a solid state drive (SSD). The memory system 3 is connected to the host device 2 through a host bus HB.

1.1.2. Configuration of Memory System

Next, an example of a configuration of the memory system 3 will be described.

As illustrated in FIG. 1, the memory system 3 includes a memory device 10 and a memory controller 20.

The memory device 10 is a non-volatile storage medium (may be referred to as a semiconductor storage device). The memory device 10 stores data received from the memory controller 20 in a non-volatile manner. Hereinafter, descriptions will be made on a case where the memory device 10 is a NAND-type flash memory. The memory device 10 may be the non-volatile storage medium other than the NAND-type flash memory.

The memory controller 20 is, for example, a system on a chip (SoC). The memory controller 20 instructs the reading operation, the writing operation, and an erasing operation to the memory device 10 based on a request (may be referred to as an instruction) from the host device 2. Further, the memory controller 20 manages a memory space of the memory device 10.

Next, an example of an internal configuration of the memory device 10 will be described. The memory device 10 may include a plurality of memory chips 11 (may be simply referred to as "chip"). Each of the plurality of memory chips 11 may independently operate. The number of memory chips 11 provided in the memory device 10 is appropriately selected.

The memory chip 11 is, for example, a semiconductor chip equipped with the NAND-type flash memory. The memory chip 11 stores data in a non-volatile manner. The memory chip 11 is connected to the memory controller 20 through a NAND BUS NB. The memory chip 11 may also be another non-volatile memory.

Next, an example of the internal configuration of the memory controller 20 will be described. The memory controller 20 includes a host interface circuit (host I/F) 21, a CPU 22, a read only memory (ROM) 23, a random access memory (RAM) 24, a buffer memory 25, an error checking and correcting (ECC) circuit 26, and a memory interface circuit (memory I/F) 27. The circuits are connected to each other by, for example, an internal bus of the memory controller 20. A function of each of the host interface circuit 21, the ECC circuit 26, and the memory interface circuit 27 may be implemented by a dedicated circuit or implemented by executing firmware by the CPU 22.

The host interface circuit 21 is an interface circuit connected to the host device 2. The host interface circuit 21 controls communication between the host device 2 and the memory controller 20. The host interface circuit 21 transmits the request and user data received from the host device 2 to each of the CPU 22 and the buffer memory 25. Further, the host interface circuit 21 transmits the user data in the buffer memory 25 to the host device 2 based on the control by the CPU 22.

The CPU 22 is a processor. The CPU 22 controls an overall operation of the memory controller 20. For example, the CPU 22 instructs the writing operation, the reading operation, and the erasing operation to the memory device 10 (memory chip 11) based on the request from the host device 2.

The CPU 22 controls the memory device 10. For example, the CPU 22 may control switching of an on state and an off state of the memory chip 11 based on an operation situation of the memory chip 11 (hereinafter, referred to as "on/off control"). More specifically, the CPU 22 supplies power voltage to the memory chip 11 that executes the operation (hereinafter, also referred to as "normal operation") such as the reading operation, the writing operation, and the erasing operation to turn on the memory chip 11 (hereinafter, also referred to as "turn on the power of the memory chip 11"). Meanwhile, the CPU 22 stops the supply of the power voltage to the memory chip 11 in a standby state to turn off the memory chip 11 (hereinafter, also referred to as "turn off the power of the memory chip 11"). The CPU 22 turns off the memory chip 11 in the standby state to prevent an increase of power consumption in the memory system 3. Hereinafter, a mode in which the CPU 22 executes an on/off control of the memory chip 11 is referred to as "low power consumption mode". In the low power consumption mode, while the CPU 22 maintains an on state, the on/off control of the memory chip 11 is repeated. When the CPU 22 executes the low power consumption mode, the CPU 22 may execute the on/off control for each memory chip 11 or execute the plurality of memory chips 11 as one unit. For example, a unit of the on/off control may be a channel CH unit, and may be the unit of the memory chip 11 which is collectively enabled by a chip enable signal CEn.

In the following description, when the CPU 22 executes various operations based on the on/off control of the memory chip 11 during the low power consumption mode, the operation will be referred to as "operation corresponding to low power consumption mode". The CPU 22 reads chip start-up data (also simply referred to as "start-up data") from the memory chip 11 before turning off the memory chip 11 during the low power consumption mode. The chip start-up data is data used for a power-on read (POR) operation which is one of a start-up operation of the memory chip 11. The memory chip 11 executes various settings and management of operable memory elements based on the chip start-up data. For example, the CPU 22 stores the chip start-up data in the RAM 24. When a target memory chip 11 is in on the on state, the CPU 22 may execute the reading operation to read the chip start-up data at a predetermined timing.

The CPU 22 controls different power-on read operations to be executed during a start-up operation of the memory chip 11 depending on whether or not the reading operation to read the chip start-up data is needed. The power-on read operation includes an operation (hereinafter, referred to as "cell reading operation") of reading the chip start-up data from the memory cell array of the target memory chip 11 and an operation (hereinafter, referred to as "setup operation") of transmitting (storing) the read chip start-up data to a register of the target memory chip 11. When the CPU 22 does not execute the reading operation of reading the chip start-up data, the CPU 22 controls the cell reading operation and the setup operation to be executed during the power-on read operation. Meanwhile, when the CPU 22 executes the reading operation of reading the chip start-up data, the CPU 22 operates to omit the cell reading operation during the power-on read operation.

More specifically, for example, as to an initial start-up operation of the memory chip 11 after turning on the memory controller 20, the CPU 22 has not executed the reading operation of reading the chip start-up data before the initial start-up operation of the memory chip 11. In this case, the CPU 22 executes the cell reading operation and the setup operation during the power-on read operation. That is, the CPU 22 executes the setup operation by using the chip start-up data that is read through the cell reading operation.

Meanwhile, for example, as to the on/off control of the memory chip 11 during the low power consumption mode, the CPU 22 has read the chip start-up data in advance from the memory chip 11 before turning off the memory chip 11. In this case, the CPU 22 transmits the chip start-up data to the memory chip 11. In addition, the CPU 22 controls the memory chip 11 to execute the power-on read operation by using the chip start-up data received from the memory controller 20. Accordingly, the cell reading operation can be omitted in the case of the power-on read operation during the low power consumption mode.

For example, the chip start-up data includes parameter information, defective block information, and defective column information. These kinds of information is different for each memory chip 11. For that reason, the CPU 22 executes the reading operation of reading the chip start-up data for each memory chip 11.

The parameter information is setting value information of the memory chip 11. For example, the parameter information may include information such as voltage and voltage application period of each wire during the writing operation, the reading operation, and the erasing operation.

The defective block information is information on an unusable block in the memory cell array of the memory chip 11. For example, the block is a unit of a memory area in which data is collectively erased from the memory chip 11. For example, the defective block information includes information on a block determined to be unusable during a shipping inspection of the memory chip 11.

The defective column information is information on an unusable column, i.e., information on an unusable bit line, in the memory cell array of the memory chip 11. For example, the defective column information includes information on a column determined to be unusable during the shipping inspection of the memory chip 11.

The ROM 23 is a non-volatile memory. For example, the ROM 23 is an electrically erasable programmable read-only memory (EEPROM™). The ROM 23 is a non-temporary storage medium that stores firmware and a program. For example, the CPU 22 expands the firmware loaded from the ROM 23 to the RAM 24.

The RAM 24 is a volatile memory. The RAM 24 is a DRAM or SRAM. The RAM 24 may be used as a work area of the CPU 22. For example, the RAM 24 stores the firmware for managing the memory device 10 or various types of management tables.

The RAM 24 according to the present embodiment stores the chip start-up data of each memory chip 11. The chip start-up data may be stored in a memory area other than the RAM 24.

The buffer memory 25 is the volatile memory. The buffer memory 25 is the DRAM or SRAM. The buffer memory 25 temporarily stores user data read from the memory device 10 by the memory controller 20 or user data received from the host device 2.

The ECC circuit 26 is a circuit that executes ECC processing. The ECC processing includes encoding processing and decoding processing of data. For example, the ECC circuit 26 generates an error correction code (e.g., parity) by executing the encoding processing of the data during the writing operation. In addition, the ECC circuit 26 appends the parity to the data. Further, the ECC circuit 26 executes the decoding processing during the reading operation. That is, the ECC circuit 26 executes the error correction processing of read data by using the parity.

The memory interface circuit 27 controls communication between the memory controller 20 and the memory device 10. More specifically, the memory interface circuit 27 transmits a command corresponding to the writing operation, the reading operation, or the erasing operation to the memory chip 11. Further, the memory interface circuit 27 receives read data from the memory chip 11 during the reading operation. The memory interface circuit 27 may have a plurality of channels CH (CH0, CH1, . . . ). The plurality of memory chips 11 may be connected to each channel CH through the NAND bus NB.

1.1.3. Configuration of Memory Chip

Figure 2:
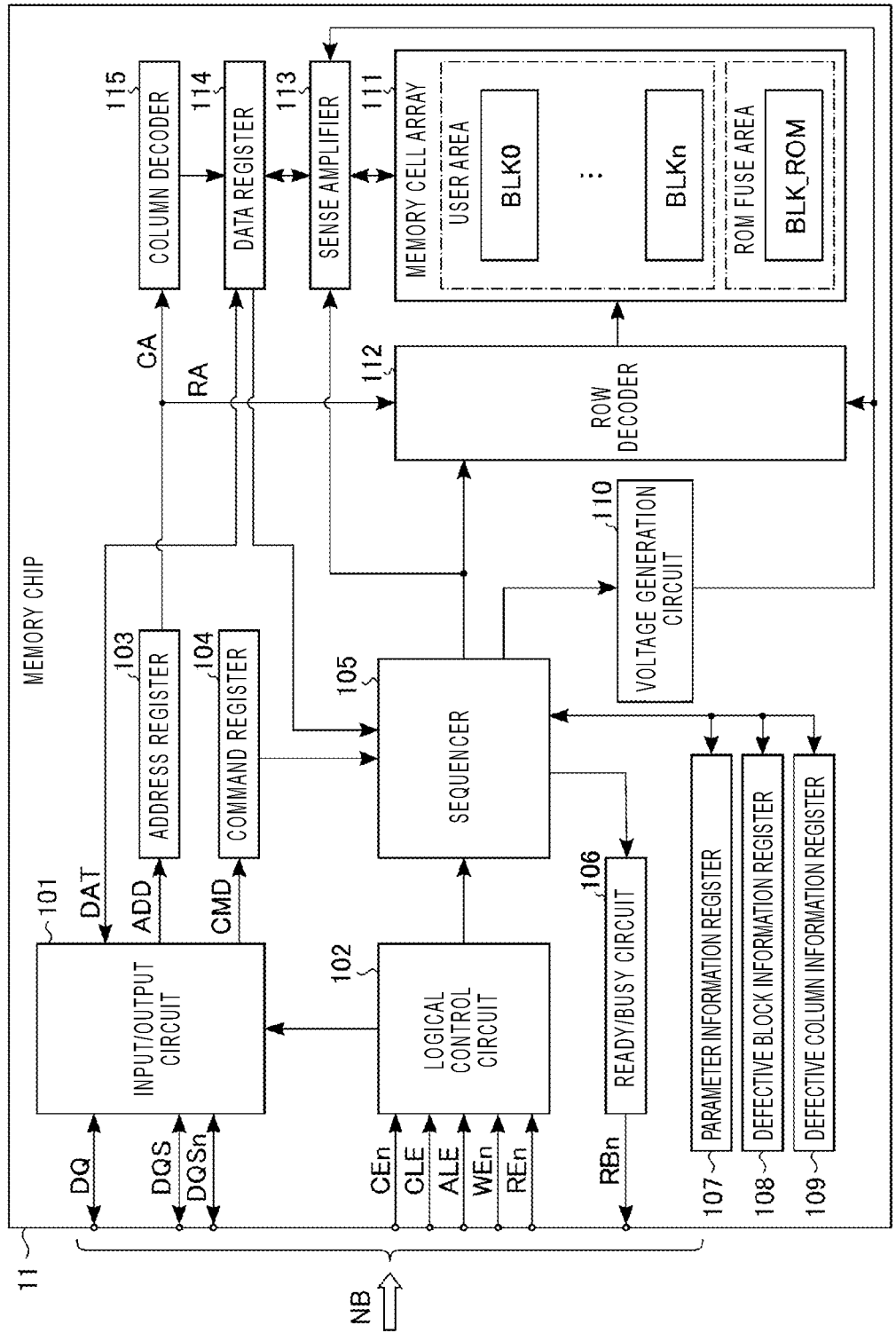
FIG. 2 is a block diagram illustrating a configuration of a memory chip provided in the memory system according to the first embodiment.

Next, referring to FIG. 2, an example of a configuration of the memory chip 11 will be described. FIG. 2 is a block diagram illustrating a configuration of the memory chip 11. In the example illustrated in FIG. 2, a part of connections among components is shown by arrow lines. However, the connections among the components are not limited thereto.

As illustrated in FIG. 2, the memory chip 11 transmits and receives a signal DQ, and timing signal DQS and DQSn to and from the memory controller 20 (more specifically, the memory interface circuit 27) via the NAND bus NB. The signal DQ is, for example, a data DAT, an address ADD, or a command CMD. The timing signal DQS and DQSn are timing signals used when inputting and outputting the data DAT. The timing signal DQSn is a reversal signal of the timing signal DQS.

In addition, the memory chip 11 receives, from the memory controller 20, for example, a chip enable signal CEn, a command latch enable signal CLE, an address latch enable signal ALE, a write enable signal WEn, and a read enable signal REn, via the NAND bus NB. Further, the memory chip 11 transmits a ready/busy signal RBn to the memory controller 20 via the NAND bus NB.

The chip enable signal CEn is a signal for enabling the memory chip 11. The signal CEn is asserted at, for example, a low ("L") level.

The command latch enable signal CLE is a signal indicating that the signal DQ is the command. The signal CLE is asserted at, for example, a high ("H") level.

The address latch enable signal ALE is a signal indicating that the signal DQ is the address. The signal ALE is asserted at, for example, the "H" level.

The write enable signal WEn is a signal for inputting the signal DQ when the signal DQ is the command CMD or the address ADD. The signal WEn is asserted at, for example, the "L" level at a timing when the memory chip 11 inputs the command CMD or the address ADD. Accordingly, every time the signal WEn is toggled, the command CMD or the address ADD is input into the memory chip 11.

The read enable signal REn is a signal for the memory controller 20 to read data from the memory chip 11. The signal REn is asserted at, for example, the "L" level. For example, the memory chip 11 generates the signals DQS and DQSn based on the signal REn at the time of outputting data.

The ready/busy signal RBn is a signal indicating whether the memory chip 11 is enabled or disabled to receive the command CMD from the memory controller 20. A ready state is a state in which the memory chip 11 is enabled to receive the command CMD from the memory controller 20. A busy state is a state in which the memory chip 11 is disabled to receive the command CMD from the memory controller 20. For example, the ready/busy signal RBn becomes the "L" level when the memory chip 11 is in the busy state.

Next, the internal configuration of the memory chip 11 will be described. The memory chip 11 includes an input/output circuit 101, a logical control circuit 102, an address register 103, a command register 104, a sequencer 105, a ready/busy circuit 106, a parameter information register 107, a defective block information register 108, a defective column information register 109, a voltage generation circuit 110, a memory cell array 111, a row decoder 112, a sense amplifier 113, a data register 114, and a column decoder 115.

The input/output circuit 101 is a circuit that performs the input/output of the signal DQ. The input/output circuit 101 is connected to the memory controller 20 via the NAND bus NB. Further, the input/output circuit 101 is connected to the logical control circuit 102, the address register 103, the command register 104, and the data register 114.

When the input signal DQ is the address ADD, the input/output circuit 101 transmits the address ADD to the address register 103. Further, when the input signal DQ is the command CMD, the input/output circuit 101 transmits the command CMD to the command register 104.

When the input signal DQ is the data DAT, the input/output circuit 101 receives the input signal DQ in synchronization with on the timing signals DQS and DQSn. In addition, the input/output circuit 101 transmits the data DAT to the data register 114. Further, the input/output circuit 101 outputs the data DAT to the memory controller 20 along with the timing signals DQS and DQSn.

The logical control circuit 102 is a circuit that performs a logical control of the memory chip 11. The logical control circuit 102 is connected to the memory controller 20 via the NAND bus NB. Further, the logical control circuit 102 is connected to the input/output circuit 101 and the sequencer 105. The logical control circuit 102 receives various control signals such as the signals CEn, CLE, ALE, WEn, and REn from the memory controller 20. The logical control circuit 102 controls the input/output circuit 101 and the sequencer 105 based on the received control signals.

The address register 103 is a register that temporarily stores the address ADD. The address register 103 is connected to the input/output circuit 101, the row decoder 112, and the column decoder 115. The address ADD includes a row address RA and a column address CA. The address register 103 transmits the row address RA to the row decoder 112. Further, the address register 103 transmits the column address CA to the column decoder 115.

The command register 104 is a register that temporarily stores the command CMD. The command register 104 is connected to the input/output circuit 101 and the sequencer 105. The command register 104 transmits the command CMD to the sequencer 105.

The sequencer 105 is a circuit that controls the memory chip 11. The sequencer 105 controls an overall operation of the memory chip 11. More specifically, for example, the sequencer 105 is connected to the logical control circuit 102, the command register 104, the ready/busy circuit 106, the parameter information register 107, the defective block information register 108, a defective column information register 109, the voltage generation circuit 110, the row decoder 112, the sense amplifier 113, and the data register 114. In addition, for example, the sequencer 105 controls the ready/busy circuit 106, the parameter information register 107, the defective block information register 108, the defective column information register 109, the row decoder 112, and the sense amplifier 113.

The sequencer 105 executes the writing operation, the reading operation, and the erasing operation based on the command CMD. The sequencer 105 may receive the chip start-up data from the data register 114. The sequencer 105 transmits and receives the parameter information to and from the parameter information register 107. The sequencer 105 transmits and receives the defective block information to and from the defective block information register 108. The sequencer 105 transmits and receives the defective column information to and from the defective column information register 109.

The ready/busy circuit 106 is a circuit that transmits the ready/busy signal RBn. The ready/busy circuit 106 transmits the ready/busy signal RBn to the memory controller 20 in accordance with the operation situation of the sequencer 105.

The parameter information register 107 is a register that temporarily stores the parameter information.

The defective block information register 108 is a register that temporarily stores the defective block information.

The defective column information register 109 is a register that temporarily stores the defective column information.

The voltage generation circuit 110 generates voltage used for the writing operation, the reading operation, and the erasing operation. The voltage generation circuit 110 is connected to the row decoder 112, the sense amplifier 113, etc. For example, the voltage generation circuit 110 supplies the voltage to the row decoder 112 and the sense amplifier 113.

The memory cell array 111 is a set of a plurality of memory cell transistors arranged in a 2D or 3D matrix configuration. The memory cell array 111 includes a user area and a read only memory (ROM) fuse area as the memory area. The user area is an area that stores the user data. The ROM fuse area is an area that stores various system data including the chip start-up data. The ROM fuse area is an area which may not be accessed by the host device 2. The memory cell array 111 includes, for example, n blocks BLK0 to BLKn and one block BLK_ROM. For example, the block BLK is a set of the plurality of memory cell transistors in which data is collectively erased. That is, the block BLK is an erasing unit of data. For example, the blocks BLK0 to BLKn are allocated to the user area. The block BLK_ROM is allocated to the ROM fuse area. A plurality of blocks BLK_ROM may also be provided. Details of the configuration of the block BLK will be described below.

The row decoder 112 is a decode circuit that decodes the row address RA. The row decoder 112 selects any one block BLK in the memory cell array 111 based on a decode result. The row decoder 112 applies voltage to a row-direction wire (e.g., a word line and a select gate line to be described below) of the selected block BLK.

The sense amplifier 113 is a circuit that writes and reads the data DAT. The sense amplifier 113 is connected to the memory cell array 111 and the data register 114. The sense amplifier 113 reads the data DAT from the memory cell array 111 during the reading operation. Further, the sense amplifier 113 supplies voltage based on the data DAT to be written (may be referred to as write data) to the memory cell array 111 during the writing operation.

The data register 114 is a register that temporarily stores the data DAT. The data register 114 is connected to the sense amplifier 113 and the column decoder 115. The data register 114 includes a plurality of latch circuits. Each latch circuit temporarily stores the write data or the read data.

The column decoder 115 is a circuit that decodes the column address CA. The column decoder 115 receives the column address CA from the address register 103. The column decoder 115 selects a latch circuit in the data register 114 based on the decode result of the column address CA.

1.1.4. Circuit Configuration of Memory Cell Array

Figure 3:
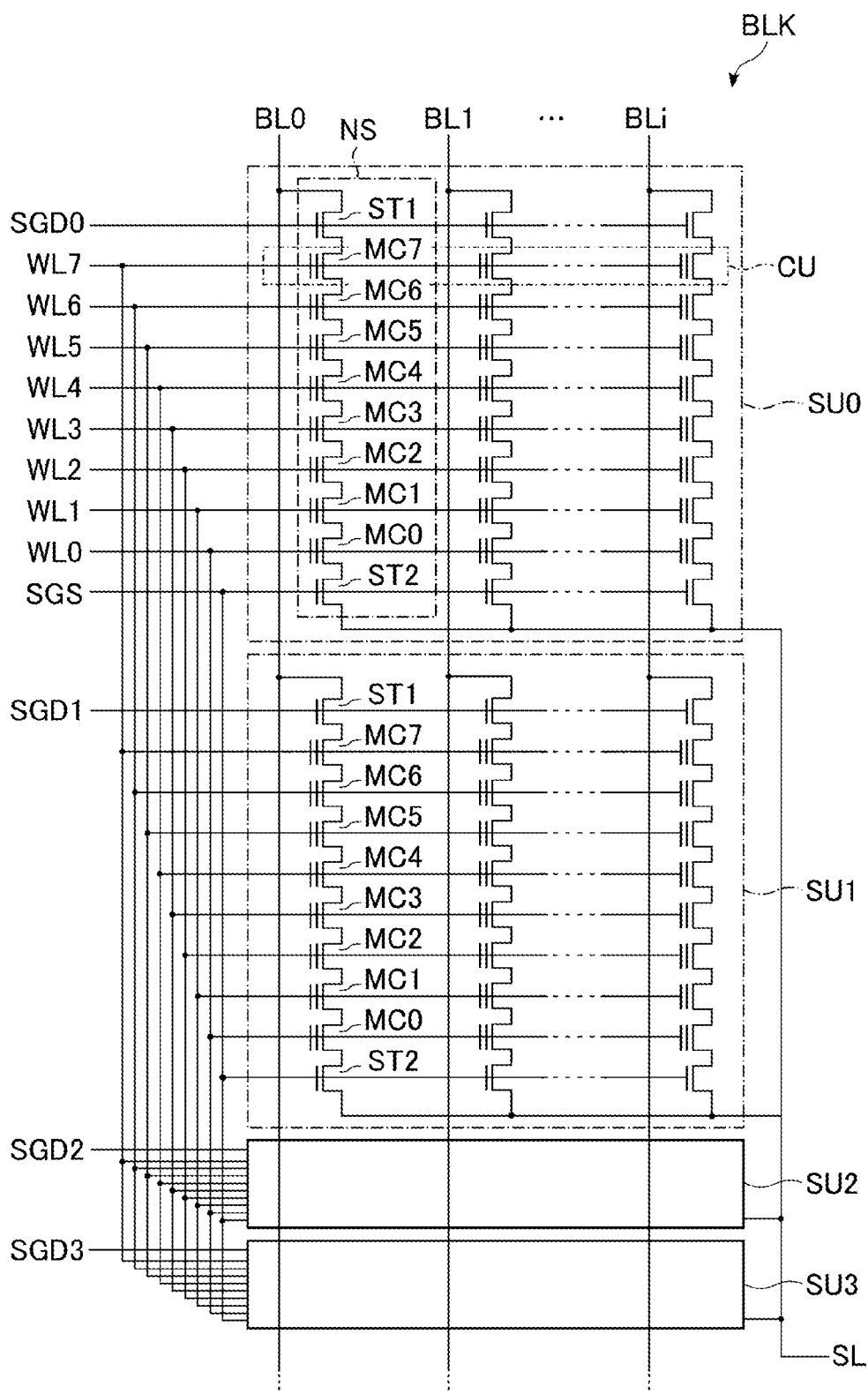
FIG. 3 is a circuit diagram illustrating an example of a circuit configuration of a memory cell array provided in the memory system according to the first embodiment.

Next, referring to FIG. 3, an example of a circuit configuration of the memory cell array 111 will be described. FIG. 3 is a circuit diagram illustrating an example of a circuit configuration of one block BLK. The configurations of the blocks BLK0 to BLKn and BLK_ROM are the same as each other.

The block BLK includes a plurality of string units SU. In the example illustrated in FIG. 3, the block BLK includes four string units SU0 to SU3. The number of string units SU provided in the block BLK is appropriately selected. The string unit SU is, for example, a set of a plurality of NAND strings NS collectively selected during the writing operation or reading operation.

Next, the internal configuration of the string unit SU will be described. The string unit SU includes the plurality of NAND strings NS. The NAND string NS is a set of memory cell transistors which are connected in series. Each of the plurality of NAND strings NS in the string unit SU is connected to any one of bit lines BL0 to BLi (i is an integer of 1 or more).

Next, the internal configuration of a NAND string NS will be described. Each NAND string NS includes a plurality of memory cell transistors MC and select transistors ST1 and ST2. In the example illustrated in FIG. 3, the NAND string NS includes eight memory cell transistors MC0 to MC7.

The memory cell transistor MC is a memory element that stores data in a non-volatile manner. The memory cell transistor MC includes a control gate and a charge storage layer. The memory cell transistor MC may be a metal-oxide-nitride-oxide-silicon (MONOS) type and a floating gate (FG) type.

The select transistors ST1 and ST2 are switching elements. Each of the select transistors ST1 and ST2 is used for selecting the string unit SU during various operations.

Current paths of the select transistor ST2, the memory cell transistors MC0 to MC7, and the select transistor ST1 in the NAND string NS are connected in series. A drain of the select transistor ST1 is connected to a bit line BL. A source of the select transistor ST2 is connected to a source line SL.

Control gates of the memory cell transistors MC0 to MC7 in the same block BLK are commonly connected to word lines WL0 to WL7, respectively. More specifically, for example, the block BLK includes four string units SU0 to SU3. In addition, each string unit SU includes a plurality of memory cell transistors MC0 of a plurality of NAND strings NS. The control gates of the plurality of memory cell transistors MC0 in the block BLK are commonly connected to one word line WL0. The same is also applied to the memory cell transistors MC1 to MC7.

Gates of a plurality of select transistors ST1 in the string unit SU are commonly connected to one select gate line SGD. More specifically, the gates of a plurality of select transistors ST1 in the string unit SU0 are commonly connected to the select gate line SGD0. The gates of the plurality of select transistors ST1 in the string unit SU1 are commonly connected to the select gate line SGD1. The gates of the plurality of select transistors ST1 in the string unit SU2 are commonly connected to the select gate line SGD2. The gates of the plurality of select transistors ST1 in the string unit SU3 are commonly connected to the select gate line SGD3.

The gates of the plurality of select transistors ST2 in the block BLK are commonly connected to the select gate line SGS. The select gate line SGS may be provided every string unit SU similarly to the select gate line SGD.

Each of the word lines WL0 to WL7, the select gate lines SGD0 to SGD3, and the select gate line SGS is connected to the row decoder 112.

The bit line BL is commonly connected to any one NAND string NS of each string unit SU of each block BLK. Each bit line BL is connected to the sense amplifier 113. For example, the same column address CA is allocated to the NAND string NS connected to the same bit line BL.

The source line SL is shared by, for example, the plurality of blocks BLK.

A set of memory cell transistors MC connected to the common word line WL in one string unit SU is referred to as, for example, "cell unit CU". In other words, the cell unit CU is a set of memory cell transistors MC collectively selected during the writing or reading operation. A page is a unit of data collectively written to (or collectively read from) the cell unit CU. The cell unit CU may have a storage capacity of 2-page data or more based on the number of bits of data stored by the memory cell transistor MC. For example, when the memory cell transistor MC is a single-level cell (SLC) that stores 1-bit data, the storage capacity of the cell unit CU is one page. Further, for example, when the memory cell transistor MC is a triple-level cell (TLC) that stores 3-bit data, the storage capacity of the cell unit CU is three pages. The number of bits of data which the memory cell transistor MC is capable of storing may be different every block BLK. For example, the memory cell transistor MC of the user area (blocks BLK0 to BLKn) may be the TLC. The memory cell transistor MC of the ROM fuse area (block BLK_ROM) may be the SLC.

1.1.5. Configurations of Data Register and Sense Amplifier

Figure 4:
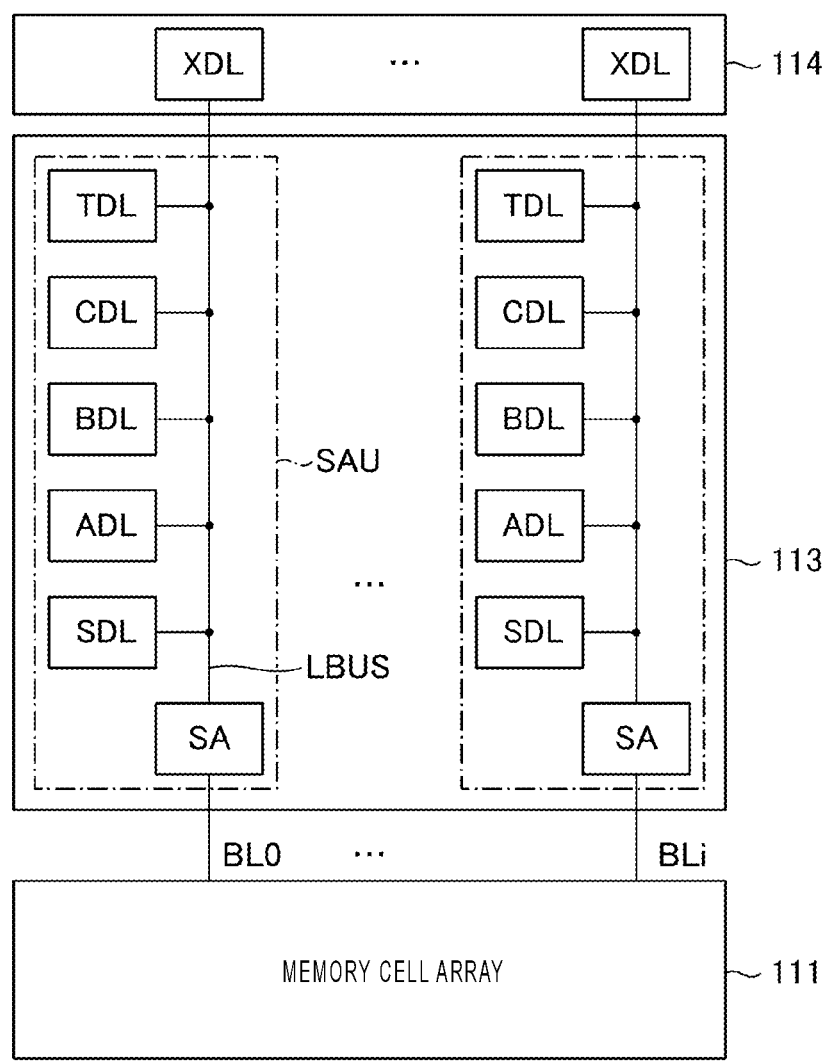
FIG. 4 is a block diagram of a data register and a sense amplifier provided in the memory system according to the first embodiment.

Next, referring to FIG. 4, an example of configurations of the data register 114 and the sense amplifier 113 will be described. FIG. 4 is a block diagram of the data register 114 and the sense amplifier 113.

As illustrated in FIG. 4, the sense amplifier 113 includes a plurality of sense amplifier units SAU provided for each bit line BL. In addition, the data register 114 includes a plurality of latch circuits XDL provided for each sense amplifier unit SAU. The column address CA is allocated to each latch circuit XDL.

The sense amplifier unit SAU includes, for example, a sense circuit SA, and latch circuits SDL, ADL, BDL, CDL, and TDL. The sense circuit SA, and the latch circuits SDL, ADL, BDL, CDL, and TDL are connected to the corresponding latch circuit XDL via a bus LBUS. In other words, the latch circuit XDL, the sense circuit SA, and the latch circuits SDL, ADL, BDL, CDL, and TDL are connected to transmit and receive data to and from each other via the bus LBUS.

The sense circuit SA senses data read to the corresponding bit line BL during the reading operation, and determines whether the read data is data "0" or data "1". Further, the sense circuit SA applies voltage to the bit line BL based on write data during the writing operation.

The latch circuits SDL, ADL, BDL, CDL, and TDL temporarily store the read data and write data. For example, the read data may be transmitted from the sense circuit SA to one of the latch circuits SDL, ADL, BDL, CDL, and TDL during the reading operation. Further, the write data may be transmitted from the latch circuit XDL to one of the latch circuits SDL, ADL, BDL, CDL, and TDL during the writing operation.

The latch circuit XDL temporarily stores the read data and the write data. The latch circuit XDL is used for input/output of data between the sense amplifier unit SAU and the input/output circuit 101.

The configuration of the sense amplifier unit SAU is not limited thereto, and may be variously changed. For example, the number of latch circuits provided in the sense amplifier unit SAU may be designed based on the number of bits of the data stored by one memory cell transistor MC.

1.2. Power-on Read Operation

Next, the power-on read operation will be described. The power-on read operation normally includes a cell reading operation and a setup operation. The memory chip 11 may separately execute each of the cell reading operation and the setup operation. When the cell reading operation and the setup operation are continuously executed, the case is also referred to as "normal power-on read operation" or "full sequence operation". In the power-on read operation during the low power consumption mode, the cell reading operation is omitted.

The cell reading operation is an operation of reading the chip start-up data from the memory cell transistor MC of the block BLK_ROM and transmitting (and storing) the read chip start-up data in the data register 114 (e.g., latch circuit XDL). For example, the sequencer 105 may execute the cell reading operation at a different timing from the start-up operation based on the control of the CPU 22. In this case, the chip start-up data stored in the data register 114 is read by the memory controller 20. For example, when the memory chip 11 executes the power-on read operation during the low power consumption mode, the CPU 22 transmits the chip start-up data to the memory chip 11. The sequencer 105 stores the chip start-up data received from the memory controller 20 in the data register 114. As a result, in the power-on read operation during the low power consumption mode, the cell reading operation is omitted.

The setup operation includes operations of storing the parameter information, the defective block information, and the defective column information in the parameter information register 107, the defective block information register 108, and the defective column information register 109, respectively. More specifically, for example, first, the sequencer 105 resets the parameter information register 107, the defective block information register 108, and the defective column information register 109. Next, the sequencer 105 reads the chip start-up data from the data register 114. Then, the sequencer 105 stores the parameter information, the defective block information, and the defective column information in the parameter information register 107, the defective block information register 108, and the defective column information register 109, respectively. For example, when the memory chip 11 executes the power-on read operation during the low power consumption mode, the sequencer 105 executes the setup operation by using the chip start-up data received from the memory controller 20. On the other hand, when the memory chip executes the normal power-on read operation, the memory chip executes the setup operation by using the chip start-up data read from the memory cell array 111.

The full sequence operation is the normal power-on read operation executed when the CPU 22 does not read the chip start-up data, e.g., when the CPU 22 starts the memory system 3.

1.2.1. Flow of Power-on Read Operation During Low Power Consumption Mode

Figure 5:
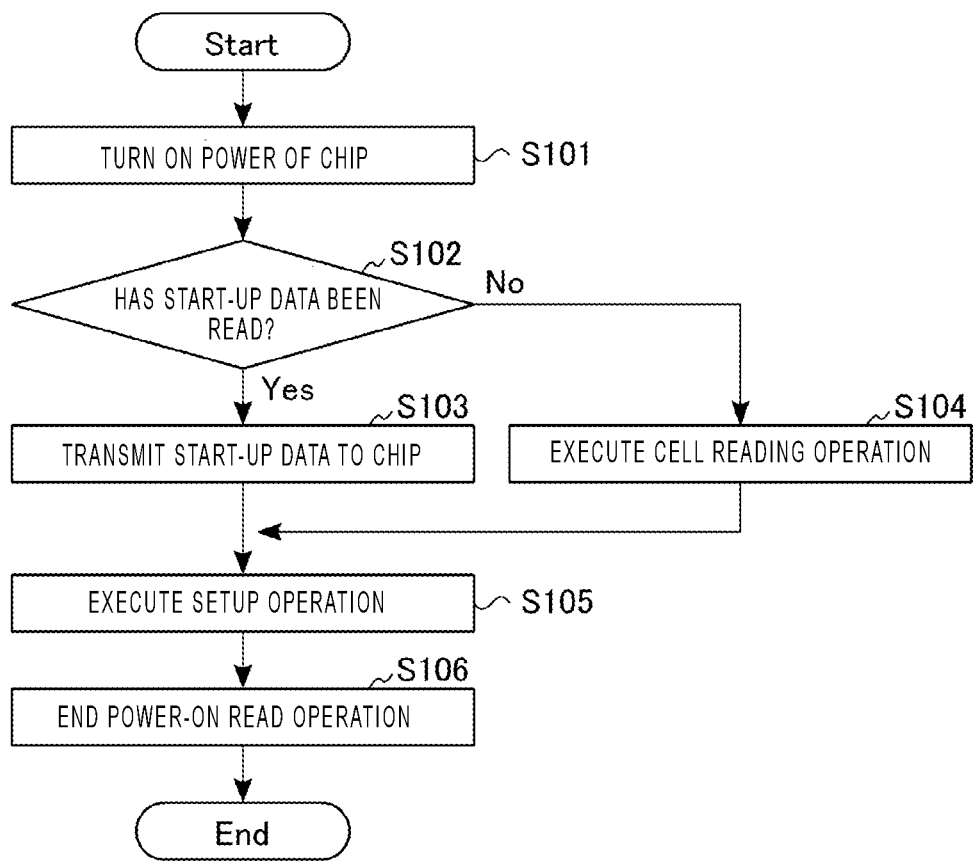
FIG. 5 is a flowchart illustrating a power-on read operation corresponding to a low power consumption mode in the memory system according to the first embodiment.

Next, referring to FIG. 5, an example of the flow of the power-on read operation during the low power consumption mode will be described. FIG. 5 is a flowchart illustrating the power-on read operation during the low power consumption mode.

As illustrated in FIG. 5, first, the CPU 22 turns on the power of the memory chip 11 (S101). That is, the CPU 22 maintains the memory chip 11 in an on state. The CPU 22 maintains the memory chip 11 in the on state, and then starts the start-up operation (power-on read operation) of the memory chip 11.

When the CPU 22 has read the chip start-up data (S102_Yes), i.e., in the case of the power-on read operation during the low power consumption mode, the CPU 22 transmits the chip start-up data to the memory chip 11. The data register 114 stores the chip start-up data received from the memory controller 20. That is, the CPU 22 writes the chip start-up data to the data register 114. Hereinafter, an operation of writing the chip start-up data to the data register 114 by the CPU 22 will be referred to as "cache writing operation". Because the chip start-up data is written in the data register 114 through the cache writing operation, the cell reading operation of the power-on read operation can be omitted.

Meanwhile, when the CPU 22 has not read the chip start-up data (S102_No), the sequencer 105 executes the full sequence operation (normal power-on read operation). That is, the sequencer 105 first executes the cell reading operation. The data register 114 stores the chip start-up data read from the block BLK_ROM.

The sequencer 105 then executes the setup operation by using the chip start-up data stored in the data register 114 (S105).

The sequencer 105 ends the power-on read operation (S106). When the start-up operation is ended, the memory chip 11 turns into an operable state. For example, the sequencer 105 turns the ready/busy signal RBn to the "H" level (ready state).

1.2.2. Stop Operation of Memory Chip During Low Power Consumption Mode

Figure 6:
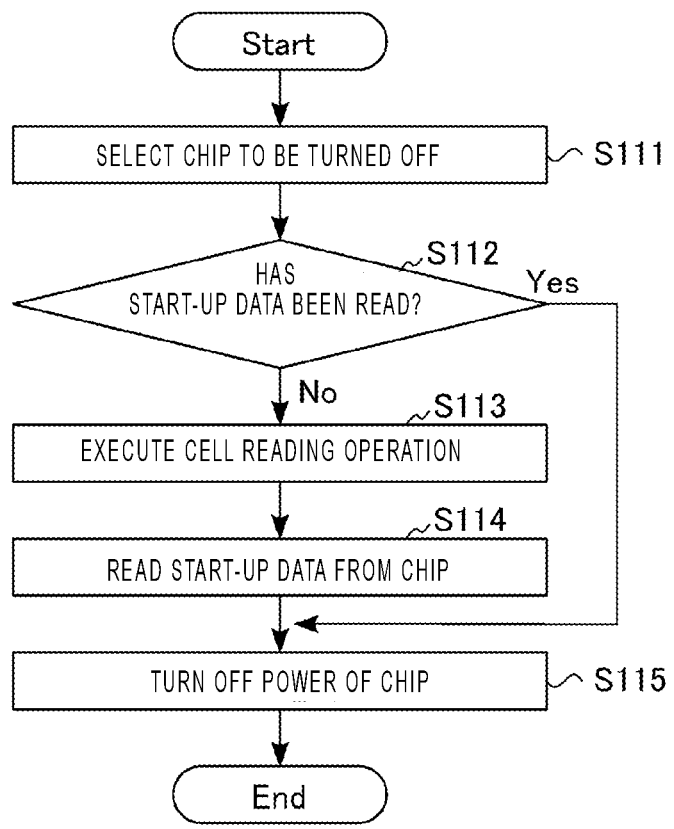
FIG. 6 is a flowchart illustrating a stop operation of the memory chip corresponding to the low power consumption mode in the memory system according to the first embodiment.

Next, referring to FIG. 6, an example of the flow of the stop operation of the memory chip 11 during the low power consumption mode will be described. FIG. 6 is a flowchart illustrating the stop operation of the memory chip during the low power consumption mode.

As illustrated in FIG. 6, first, the CPU 22 selects the memory chip 11 to be turned off (i.e., a target memory chip 11), for example, among the memory chips 11 which are in the on state and the standby state (S111).

The CPU 22 determines whether the chip start-up data of the target memory chip 11 has been read (S112). For example, the CPU 22 executes the reading operation of reading the chip start-up data from the target memory chip 11 as a ready operation of turning off the target memory chip 11. In other words, the stop operation of the memory chip 11 includes the reading operation of reading the chip start-up data and the operation of turning off the memory chip 11. In this case, the CPU 22 first determines whether the chip start-up data has been read. The timing when the CPU 22 executes the reading operation of reading the chip start-up data is not limited to a time before turning off the memory chip 11. The CPU 22 may execute the reading operation (including the operation of determining whether reading is completed) of reading the chip start-up data at a predetermined timing with respect to a memory chip 11 for which the ready/busy signal RBn is at the "H" level and in which no normal operation is executed.

When the chip start-up data has not been read (S112_No), the CPU 22 executes the cell reading operation with respect to the target memory chip 11 (S113).

The CPU 22 reads the chip start-up data from the data register 114 of the target memory chip 11 (S114). Hereinafter, an operation of reading the data from the data register 114 by the CPU 22 will be referred to as "cache reading operation". For example, the CPU 22 stores the start-up data that is read through the cache reading operation in the RAM 24.

When the chip start-up data has been read (S112_Yes), the process by the CPU 22 skips S113 and S114.

The CPU 22 reads the chip start-up data, and then turns off the target memory chip 11 (S115).

1.2.3. Command Sequence of Full Sequence Operation

Figure 7:
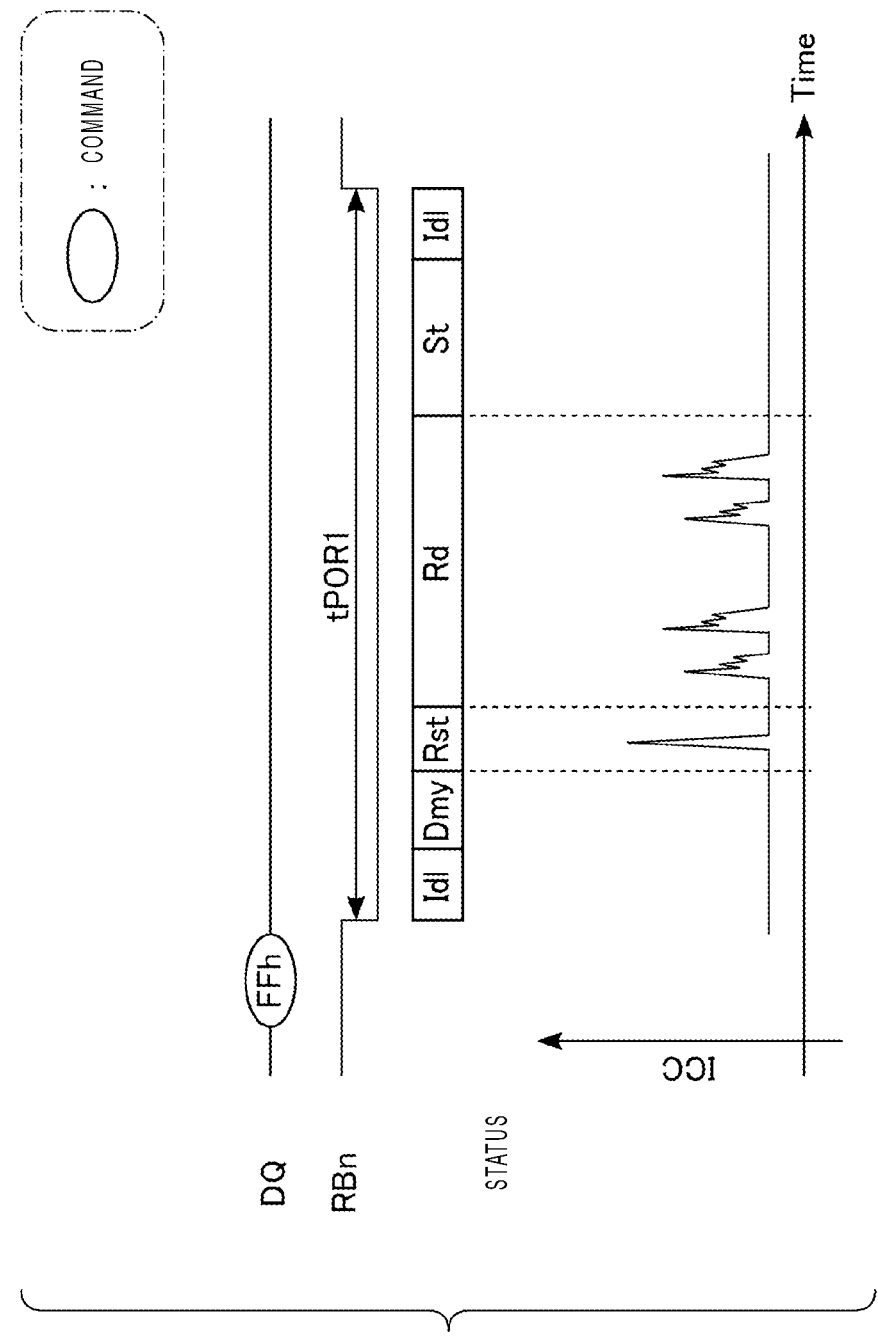
FIG. 7 is a diagram illustrating a command sequence and current profile of a full sequence operation in the memory system according to the first embodiment.

Next, an example of the command sequence of the full sequence operation will be described with reference to FIG. 7. FIG. 7 is a diagram illustrating the command sequence of the full sequence operation and current profile. In the example illustrated in FIG. 7, for simplification of description, the signal DQ and the signal RBn are illustrated, and the signals CEn, CLE, ALE, WEn, and REn are omitted. Hereinafter, in the signal DQ, the command is written in a circular frame, the address is written in a rectangular frame, and the data is written in a hexagonal frame. Further, in the example illustrated in FIG. 7, a current waveform of currents ICC flowing in the memory chip 11 is illustrated as well.

As illustrated in FIG. 7, the CPU 22 transmits a command "FFh" to the memory chip 11. The command "FFh" is a command of instructing execution of the power-on read operation.

When the sequencer 105 receives the command "FFh", the sequencer 105 executes the normal power-on read operation (i.e., full sequence operation) by setting the signal RBn to the "L" level. The full sequence operation includes a standby period Idl, a dummy period Dmy, a reset period Rst, a read period Rd, and a set period St as a status.

The standby period Idl is a standby period until a next operation is started, which is provided at the initial and the last of the power-on read operation.

The dummy period Dmy is a period to adjust a timing of executing the next operation. For example, when the plurality of memory chips 11 simultaneously execute the power-on read operation, peaks (simply also referred to as "current peak") of currents ICC from respective memory chips 11 overlap, and as a result, a maximum current in the memory device 10 increases. In this case, a length of the dummy period of each memory chip 11 is shifted to delay the timing of the current peak. The dummy period Dmy may be omitted.

The reset period Rst is a period of executing a reset operation of the parameter information register 107, the defective block information register 108, and the defective column information register 109. Normally, one current peak occurs during the reset period Rst due to the reset operation.

The read period Rd is a period of executing the cell reading operation. In the read period Rd, the chip start-up data is read from the block BLK_ROM. In addition, the read chip start-up data is stored in the data register 114. In the example illustrated in FIG. 7, four current peaks occurs during the read period Rd. For example, two current peaks becomes one set and correspond to one reading operation. Accordingly, four current peaks indicate that two reading operations are executed. For example, two reading operations are executed separately for bit lines BL of odd numbers (hereinafter, referred to as "odd bit line BL") and bit lines BL of even numbers (hereinafter, referred to as "even bit line BL"). As a result, an influence of coupling noise received from a neighboring bit line BL may be reduced and a convergence time of the voltage of the bit line BL may be reduced. Accordingly, the reading operation may be speeded up. For example, first and third current peaks occur when a pump in the voltage generation circuit 110 is started and voltage application to the word line WL is initialized. For example, second and fourth current peaks occur when applying the voltage to the word line WL and the bit line BL (odd bit line BL or even bit line BL) selected as the target of the reading operation. The number of current peaks and the timing of the current peak are appropriately selected.

For example, when the reading operation of the even bit line BL and the reading operation of the odd bit line BL are executed in order, the reading result of the even bit line BL is first stored in the latch circuit ADL. Next, the reading result of the odd bit line BL is added to the data of the latch circuit ADL. As a result, reading results (i.e., chip start-up data) of all bit lines BL are stored in the latch circuit ADL. The data of the latch circuit ADL is transmitted to the latch circuit XDL. For example, the latch circuits BDL, CDL, and TDL may be used equally to the latch circuit ADL when the chip start-up data is 2-page data or more or when the chip start-up data is divided.

The set period St is a period of executing the setup operation. In the example illustrated in FIG. 7, the current peak does not occur in the set period St.

The sequencer 105 sets the signal RBn to the "H" level when the full sequence operation is ended. Hereinafter, a period when the sequence 105 sets the signal RBn to the "L" level and executes the full sequence operation will be referred to as "period tPOR1".

1.2.4. Command Sequence of Cell Reading Operation and Cache Reading Operation

Figure 8:
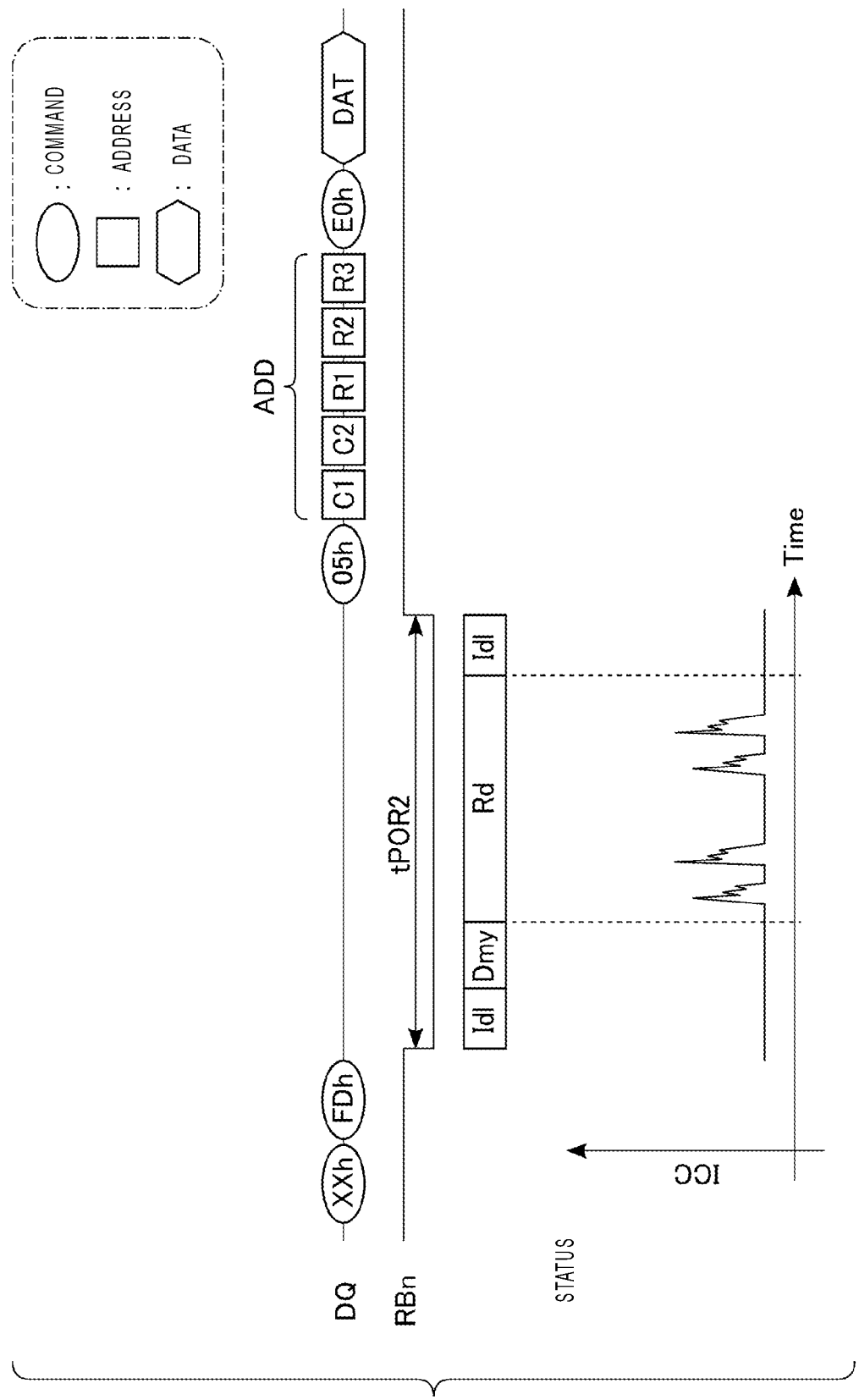
FIG. 8 is a diagram illustrating command sequence and current profile of a cell reading operation and a cache reading operation in the memory system according to the first embodiment.

Next, an example of the command sequence of the cell reading operation and the cache reading operation will be described with reference to FIG. 8. FIG. 8 is a diagram illustrating the command sequence of the cell reading operation and the cache reading operation, and current profile. In the example illustrated in FIG. 8, for simplification of description, the signal DQ and the signal RBn are illustrated, and the signals CEn, CLE, ALE, WEn, and REn are omitted. Further, in the example illustrated in FIG. 8, the current waveform of the currents ICC flowing in the memory chip 11 during the cell reading operation is illustrated jointly.

As illustrated in FIG. 8, the CPU 22 transmits commands "XXh" an "FDh" to the memory chip 11. The command "XXh" is a prefix command of instructing omission of the setup operation (i.e., limited to the cell reading operation) during the power-on read operation. The command "FDh" is a command of instructing execution of the power-on read operation by manual (i.e., at a timing other than the start-up operation).

When the sequencer 105 receives the commands "XXh" and "FDh", the sequencer 105 executes the cell reading operation by setting the signal RBn to the "L" level. The cell reading operation includes the standby period Idl, the dummy period Dmy, and the read period Rd as the status. A flow of the cell reading operation is the full sequence operation described with reference to FIG. 7 from which the reset period Rst and the set period St are omitted. Similarly to the full sequence operation, four current peaks occur during the read period Rd.

The sequencer 105 sets the signal RBn to the "H" level when the cell reading operation is ended. Hereinafter, a period when the sequencer 105 sets the signal RBn to the "L" level and executes the cell reading operation will be referred to as "period tPOR2". Since the reset operation and the setup operation are omitted, the period tPOR2 is shorter than the period tPOR1.

The CPU 22 executes the cache reading operation when receiving the signal RBn at the "H" level. More specifically, the CPU 22 first transmits a command "05h" to the memory chip 11. The command "05h" is a command of notifying the cache reading operation. Next, the CPU 22 transmits, to the memory chip 11, for example, 5-cycle addresses ADD (e.g., 2-cycle column addresses "C1" and "C2" and 3-cycle row addresses "R1", "R2", and "R3"). Next, the CPU 22 transmits a command "E0h" to the memory chip 11. The command "E0h" is a command of instructing execution of the cache reading operation. When the sequencer 105 receives the command "E0h", the sequencer 105 transmits, to the memory controller 20, the chip start-up data "DAT" stored in the data register 114 while setting the signal RBn to the "H" level.

1.2.5. Command Sequence of Cache Writing Operation and Setup Operation

Figure 9:
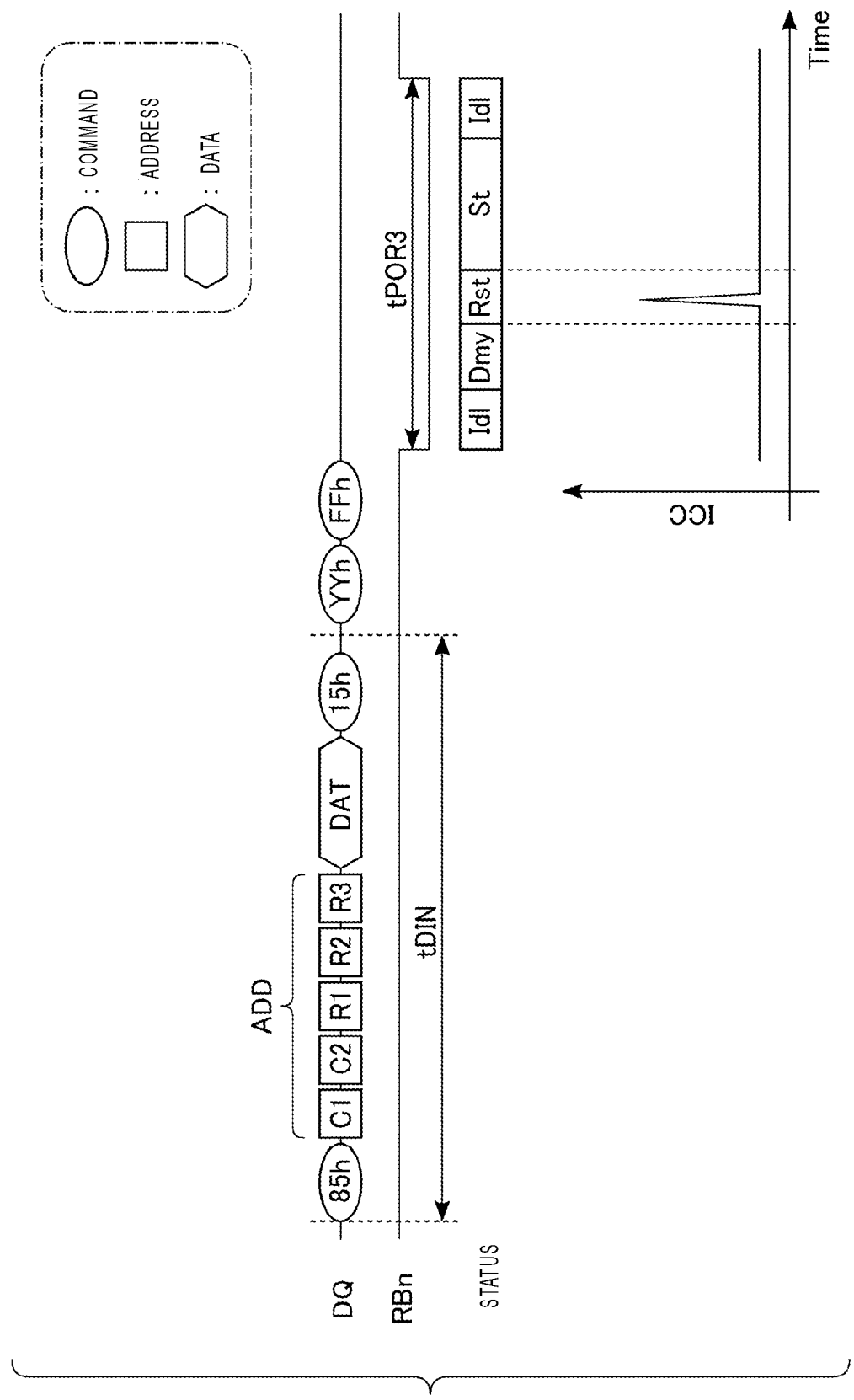
FIG. 9 is a diagram illustrating a command sequence and current profile of a cache writing operation and a setup operation in the memory system according to the first embodiment.

Next, an example of the command sequence of the cache writing operation and the setup operation will be described with reference to FIG. 9. FIG. 9 is a diagram illustrating the command sequence of the cache writing operation and the setup operation, and the current profile. In the example illustrated in FIG. 9, for simplification of description, the signal DQ and the signal RBn are illustrated, and the signals CEn, CLE, ALE, WEn, and REn are omitted. Further, in the example illustrated in FIG. 9, the current waveform of the currents ICC flowing in the memory chip 11 during the setup operation is illustrated as well.

As illustrated in FIG. 9, first, the CPU 22 transmits a command "85h" to the memory chip 11. The command "85h" is a command of notifying execution of the cache writing operation to the memory chip 11. Next, the CPU 22 transmits the same address ADD as the cache reading operation described with reference to FIG. 8. Next, the CPU 22 transmits the chip start-up data "DAT" to the memory chip 11. Next, the CPU 22 transmits a command "15h" to the memory chip 11. The command "15h" is a command of instructing execution of the cache writing operation. The command "15h" may also be omitted.

When the sequencer 105 receives the command "15h", the sequencer 105 executes the cache writing operation while setting the signal RBn to the "H" level. Hereinafter, a period until the sequencer 105 ends the cache writing operation by receiving a command "85h" will be referred to as "period tDIN".

Next, the CPU 22 transmits commands "YYh" and "FFh" to the memory chip 11 in order to execute the setup operation. The command "YYh" is a prefix command indicating omission of the cell reading operation (i.e., limited to the setup operation) during the power-on read operation.

When the sequencer 105 receives the commands "YYh" and "FFh", the sequencer 105 executes the setup operation by setting the signal RBn to the "L" level. The setup operation includes the standby period Idl, the dummy period Dmy, the reset period Rst, and the set period St as the status. A flow of the setup operation is the full sequence operation described with reference to FIG. 7 from which the read period Rd is omitted. Similarly to the full sequence operation, one current peak occurs during the reset period Rst. In other words, in the power-on read operation during the low power consumption mode, one current peak occurs during the reset period Rst and the current peak corresponding to the cell reading operation does not occur.

The sequencer 105 sets the signal RBn to the "H" level when the setup operation is ended. Hereinafter, a period when the sequence 105 sets the signal RBn to the "L" level and executes the setup operation (the power-on read operation during the low power consumption mode) will be referred to as "period tPOR3". The period tPOR3 is shorter than the period tPOR1 and the period tPOR2. The period tDIN is also shorter than the read period Rd. Accordingly, a total period of the period tDIN and the period tPOR3 is shorter than the period tPOR1. That is, a total processing time of the cache writing operation and the setup operation is shorter than a processing time of the full sequence operation. In other words, a combination of the cache writing operation and the power-on read operation during the low power consumption mode is shorter in the processing time than the normal power-on read operation.

Figure 10:
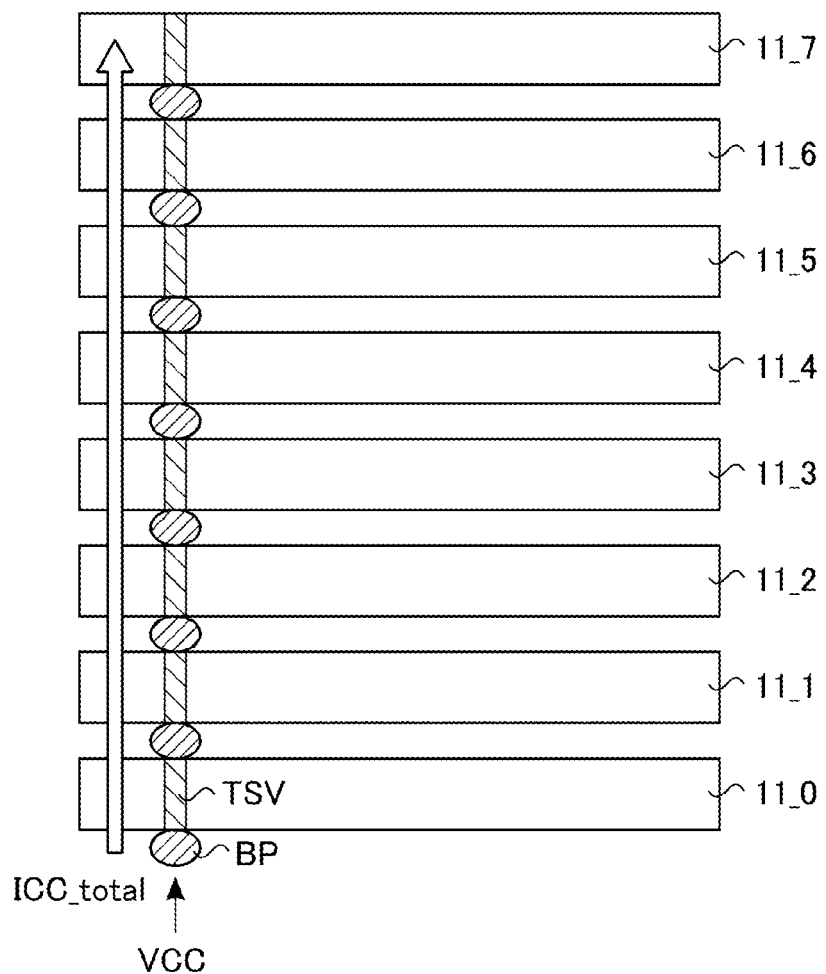
FIG. 10 is a cross-sectional diagram of a memory device illustrating an example in which memory chips provided in the memory system according to the first embodiment are stacked.
Figure 11:
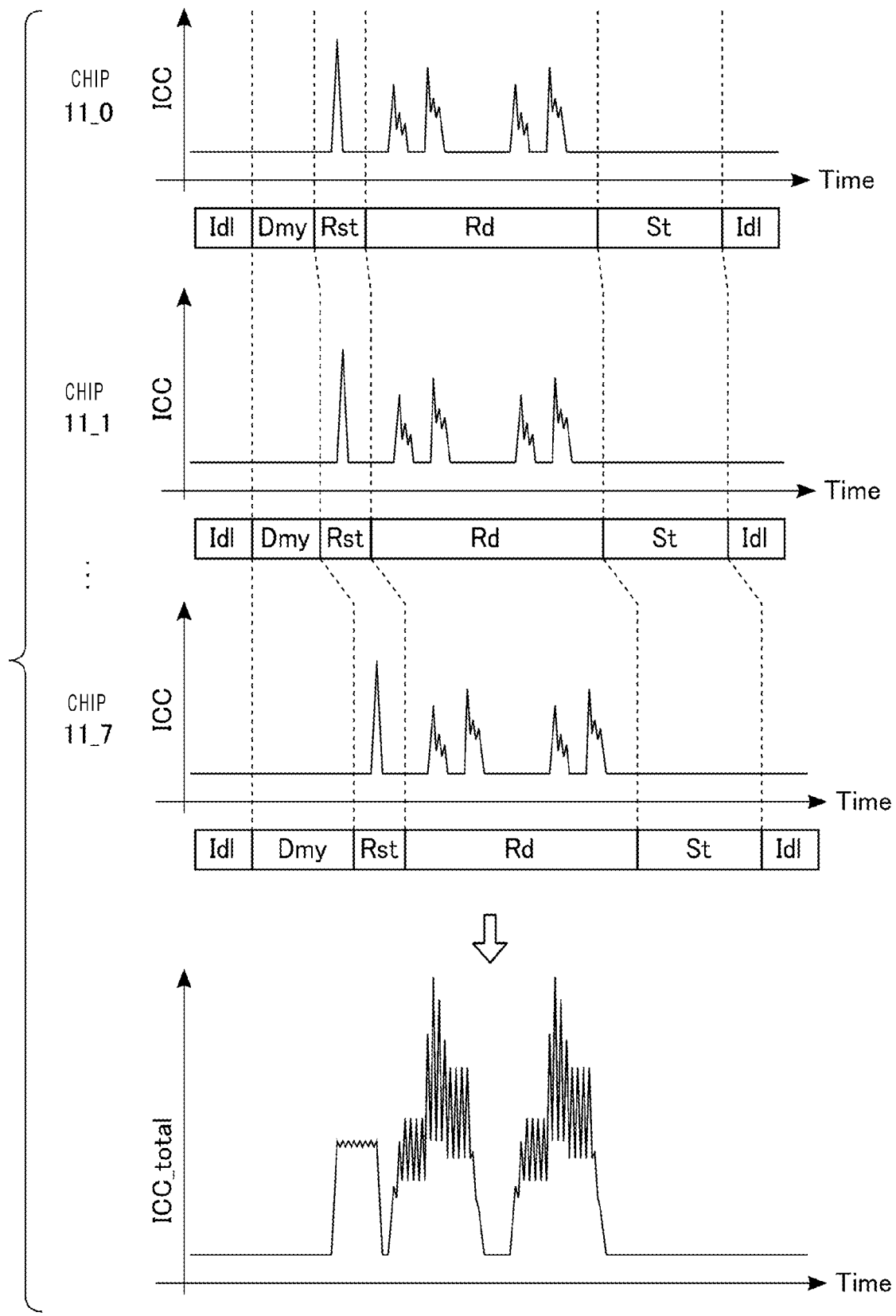
FIG. 11 is a diagram illustrating currents when the memory chips provided in the memory system according to the first embodiment execute the full sequence operation.
Figure 12:
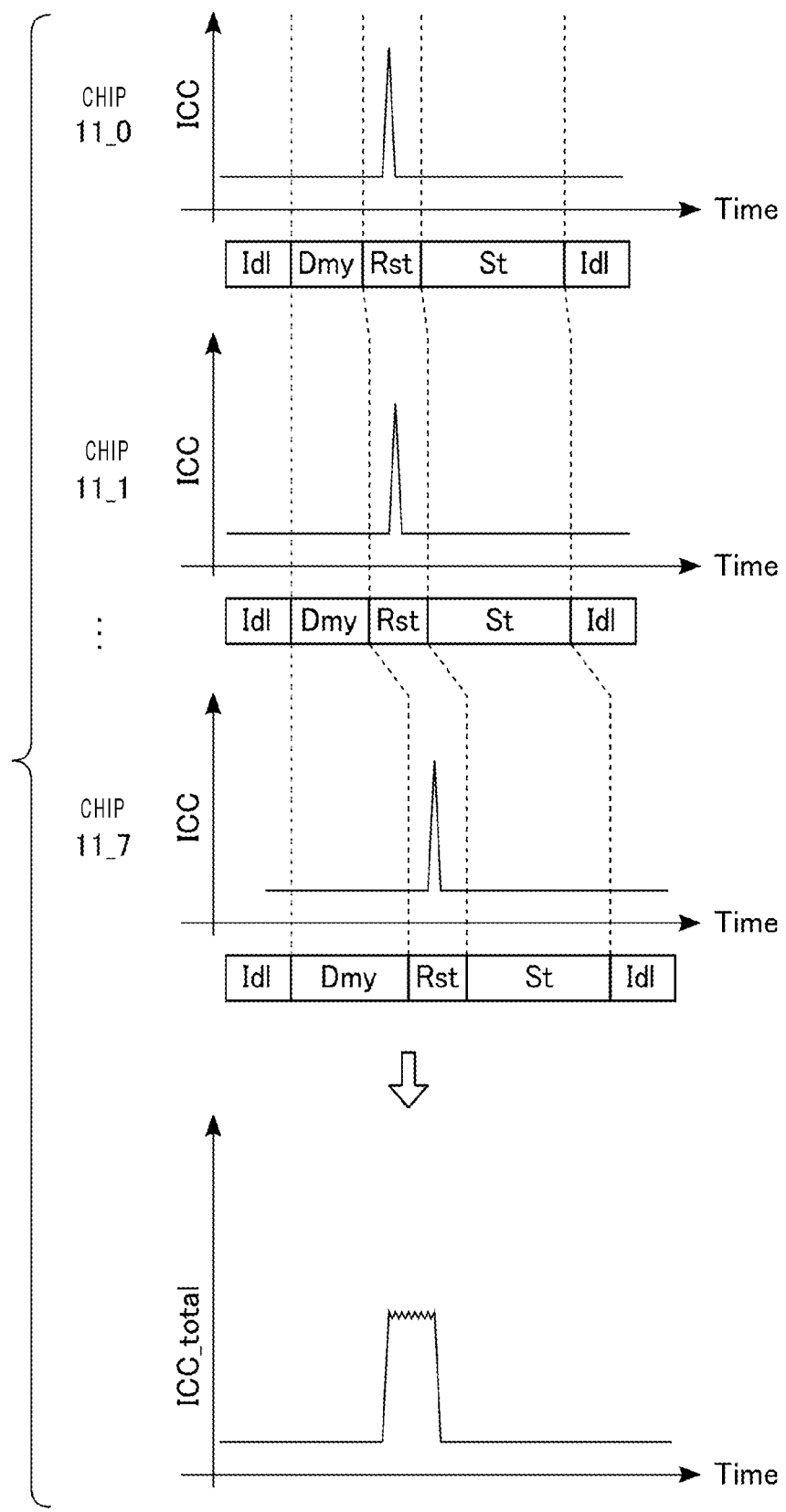
FIG. 12 is a diagram illustrating an example of currents when the memory chips provided in the memory system according to the first embodiment execute the setup operation.
Figure 13:
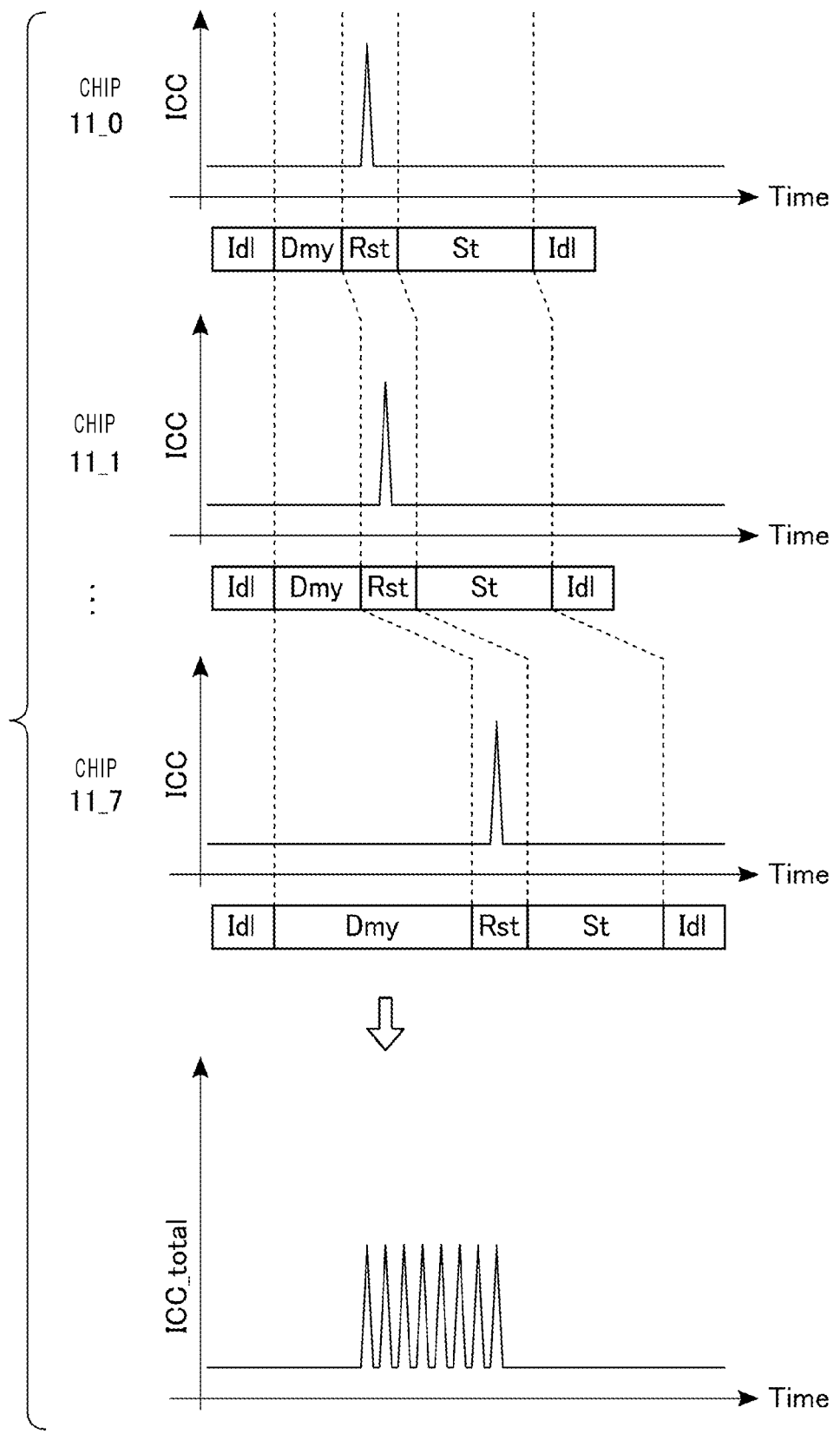
FIG. 13 is another diagram illustrating an example of current profile when the memory chips provided in the memory system according to the first embodiment execute the setup operation.

1.3. Specific Example of Current Consumption by Power-on Read Operation of Plurality of Memory Chips Next, a specific example of the current flow during the power-on read operation by the plurality of memory chips 11 will be described with reference to FIGS. 10 to 13. FIG. 10 is a cross-sectional diagram of the memory device 10 illustrating an example in which memory chips 11_0 to 11_7 are stacked. In the example illustrated in FIG. 10, for simplification of description, a component which is not related to the supply of the power voltage VCC is omitted. FIG. 11 is a diagram illustrating the current profile when the memory chips 11_0 to 11_7 execute the full sequence operation. FIGS. 12 and 13 are diagrams illustrating examples of the current profile when the memory chips 11_0 to 11_7 execute the setup operation. In the examples illustrated in FIGS. 12 and 13, the lengths of the dummy period Dmy are different from each other.

First, an example of a cross-sectional structure of the memory device 10 is described.

As illustrated in FIG. 10, for example, in the memory device 10, eight memory chips 11_0 to 11_7 are stacked. For example, the memory chips 11_0 to 11_7 are commonly connected to the channel CH0. In addition, the power voltage VCC is commonly supplied to the memory chips 11_0 to 11_7. More specifically, for example, each memory chip 11 includes a conductor TSV electrically connecting an electrode pad provided on an upper surface of the chip and an electrode pad provided on a lower surface. The conductor TSV may be one via plug penetrating the memory chip 11 and also include a plurality of via plugs and wiring layers. A bump BP is provided between the respective memory chips 11. The bump BP is composed of a conductive material. The conductors TSV of the memory chips 11_0 to 11_7 are electrically connected to each other through the bump BP. The power voltage VCC is applied to each conductor TSV toward the memory chip 11_7 from the memory chip 11_0. That is, the power voltage VCC is supplied to each memory chip 11. In such a structure, a synthetic current of currents ICC flowing through the memory chips 11 is referred to as a total current ICC_total.

Next, the total current ICC_total when the memory chips 11_0 to 11_7 execute the normal power-on read operation (i.e., full sequence operation) will be described.

As illustrated in FIG. 11, when the full sequence operation is executed in the memory chips 11_0 to 11_7, the CPU 22 changes the length of the dummy period Dmy of each memory chip 11. As a result, the CPU 22 may shift the current peak of each memory chip 11. However, in the case of the full sequence operation, a plurality of current peaks occurs. For example, as described with reference to FIG. 7, in the case of the full sequence operation, one current peak occurs during the reset period Rst and four current peaks occur during the read period Rd. In the example illustrated in FIG. 11, the length of the dummy period Dmy of each memory chip is differentiated so that the current peaks during the reset period Rst do not overlap with each other. However, during the read period Rd, the current peaks of the plurality of memory chips 11 overlap with each other. In the case of the full sequence operation, it is difficult to control so that the current peaks of the plurality of memory chips 11 do not overlap with each other. As a result, a maximum value of the total current ICC_total increases significantly as compared with the current ICC of one memory chip 11. When it is necessary to set the maximum value of the total current ICC_total to a predetermined value or less, the length of the dummy period Dmy of each memory chip is further increased so as to prevent the current peaks of the plurality of memory chips 11 from overlapping with each other, and the full sequence operation time is further increased.

Next, the total current ICC_total when the memory chips 11_0 to 11_7 execute the power-on read operation during the low power consumption mode will be described.

As illustrated in FIG. 12, when the memory chips 11_0 to 11_7 execute the setup operation of the power-on read operation during the low power consumption mode, one current peak occurs during each reset period Rst. Since the number of current peaks in each memory chip 11 is one, it is easy to differentiate the length of the dummy period Dmy of each memory chip 11 so as to prevent the current peaks of the respective memory chips 11 from overlapping with each other. As a result, the increase of the total current ICC_total may be prevented. In the case of the power-on read operation during the low power consumption mode, overlap of the current peaks during the reset period Rst described with reference to FIG. 11 and overlap of the current peaks during the read period Rd need not be considered. As a result, as illustrated in FIG. 13, an adjustment width of the dummy period Dmy may be larger than the full sequence operation so that the current peak of the reset period Rst of each memory chip 11 can be separated.

1.4. Effect According to Embodiment

By the configuration according to the first embodiment, the processing capability of the memory system may be improved. This effect will be described in detail.

During the low power consumption mode, the on/off control of the memory chip 11 is executed. In this case, each time the memory chip 11 is turned on, the power-on read operation is executed in the memory chip 11. In order to enhance the processing capability of the memory system, shortening the processing time of the power-on read operation is required.

In this regard, by the configuration according to the first embodiment, when the memory chip 11 is in the on state, the CPU 22 may read the chip start-up data from the memory chip 11. When the memory chip 11 executes the power-on read operation during the low power consumption mode, the CPU 22 may transmit the pre-read chip start-up data to the memory chip 11. That is, the CPU 22 may write the chip start-up data to the data register 114 of the memory chip 11. The memory chip 11 may execute the setup operation by using the chip start-up data received from the memory controller 20. Accordingly, the memory chip 11 may omit the cell reading operation of reading the chip start-up data. Accordingly, the processing time of the power-on read operation during the low power consumption mode may be shortened. Accordingly, the processing capability of the memory system may be improved.

Further, by the configuration according to the embodiment, in the power-on read operation during the low power consumption mode, the current peak caused by the cell reading operation may be prevented. Therefore, the increase of the current during the power-on read operation may be prevented.

Further, by the configuration according to the embodiment, when the power-on read operation during the low power consumption mode is executed in the plurality of memory chips 11, the timing of the current peaks that occur during the reset operation are shifted, thereby preventing the increase of the maximum current.

Further, by the configuration according to the embodiment, in the power-on read operation during the low power consumption mode, the cell reading operation may be omitted. As a result, the number of execution times of the reading operation in the memory cell array 111 may be reduced. As a result, read disturb caused by the increase of the number of reading times may be prevented, and mis-reading of the chip start-up data may be prevented. Accordingly, the reliability of the memory system may be improved.

2. Second Embodiment

Next, a second embodiment will be described. In the second embodiment, three examples are described for the configuration of the memory system 3 different from the first embodiment. Hereinafter, differences from the first embodiment will be primarily described.

2.1. First Example

Figure 14:
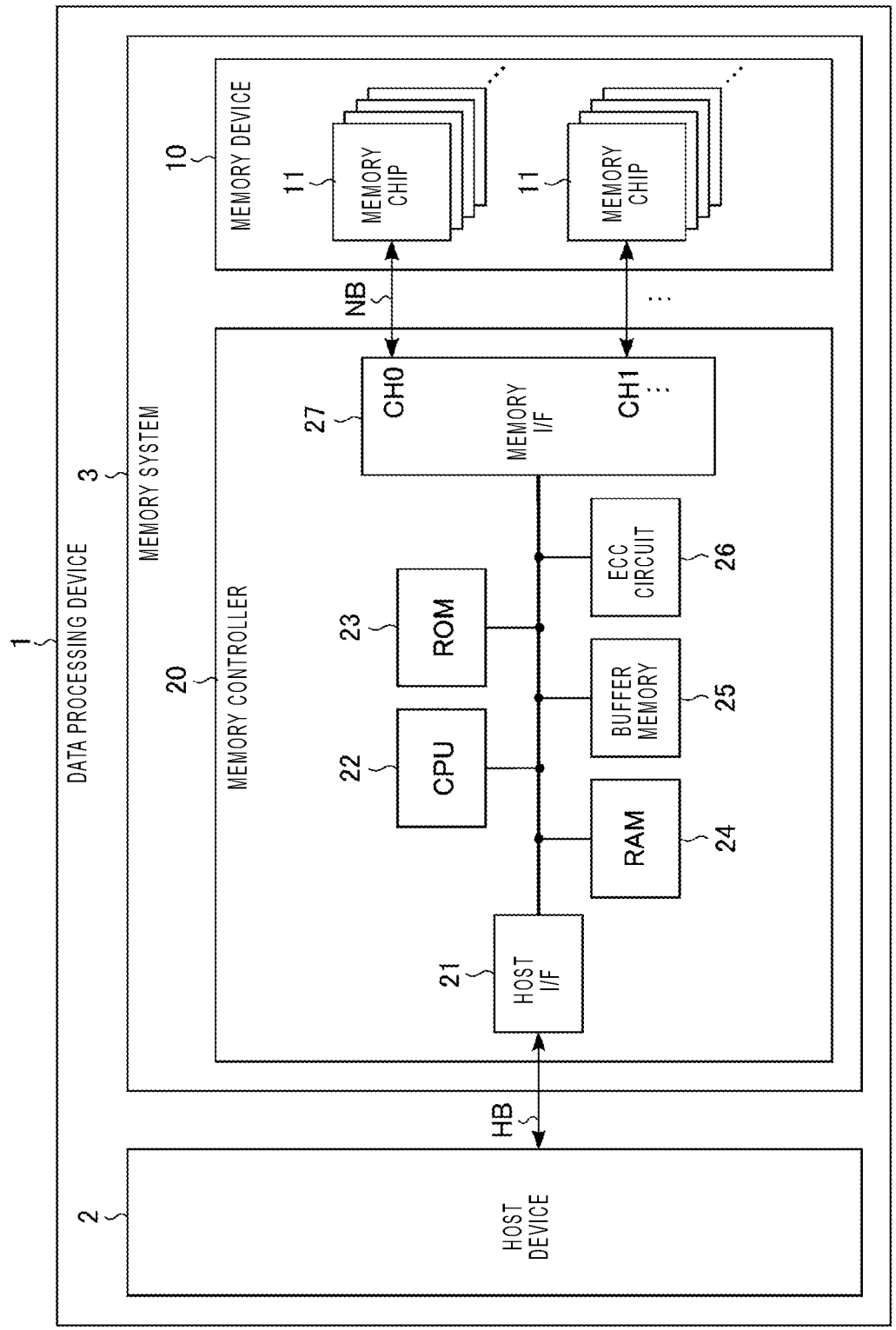
FIG. 14 is a block diagram illustrating an example of an overall configuration of a data processing device including a memory system according to a first example of a second embodiment.

First, a first example is described.
2.1.1. Configuration of Memory System
First, referring to FIG. 14, a configuration of the memory system 3 is described. FIG. 14 is a block diagram illustrating an example of an overall configuration of a data processing device 1 according to the first example.

As illustrated in FIG. 14, the difference from the first embodiment is that the chip start-up data is not stored in the RAM 24. Other configurations of the memory controller 20 are the same as those of the first embodiment.

2.1.2. Configuration of Memory Chip

Figure 15:
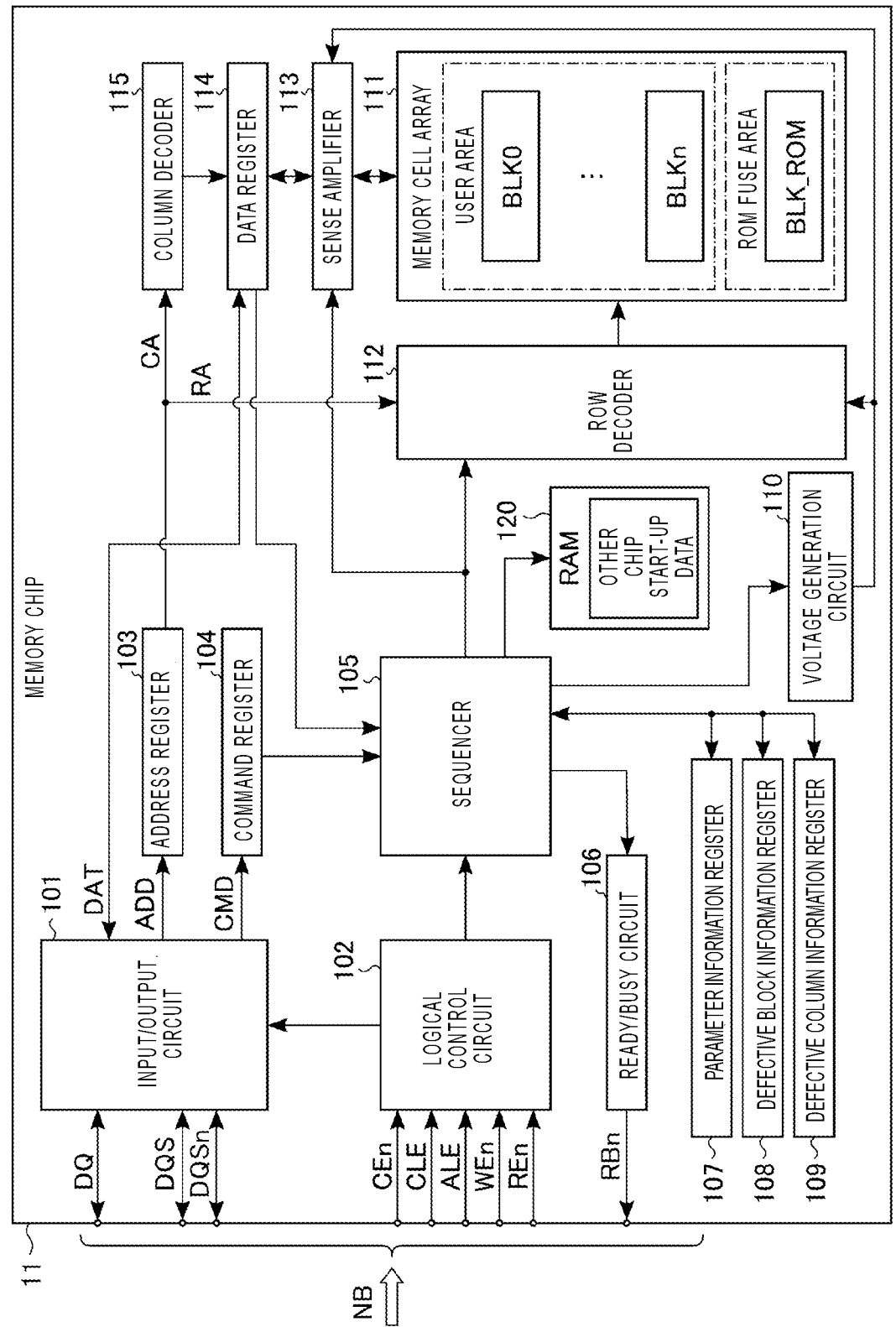
FIG. 15 is a block diagram illustrating a configuration of a memory chip including the memory system according to the first example of the second embodiment.

Next, referring to FIG. 15, a configuration of the memory chip 11 will be described. FIG. 15 is a block diagram illustrating a configuration of the memory chip 11. In the example illustrated in FIG. 15, a part of connections among components are shown by arrow lines. However, the connections among the components is not limited thereto.

As illustrated in FIG. 15, the difference from the first embodiment is that the memory chip 11 includes the RAM 120. Other configurations are the same as those of the first embodiment.

The RAM 120 is a volatile memory. The RAM 120 is a DRAM or SRAM. The RAM 120 of the example stores chip start-up data (hereinafter, referred to as "the other chip start-up data") of another memory chip 11.

Figure 16:
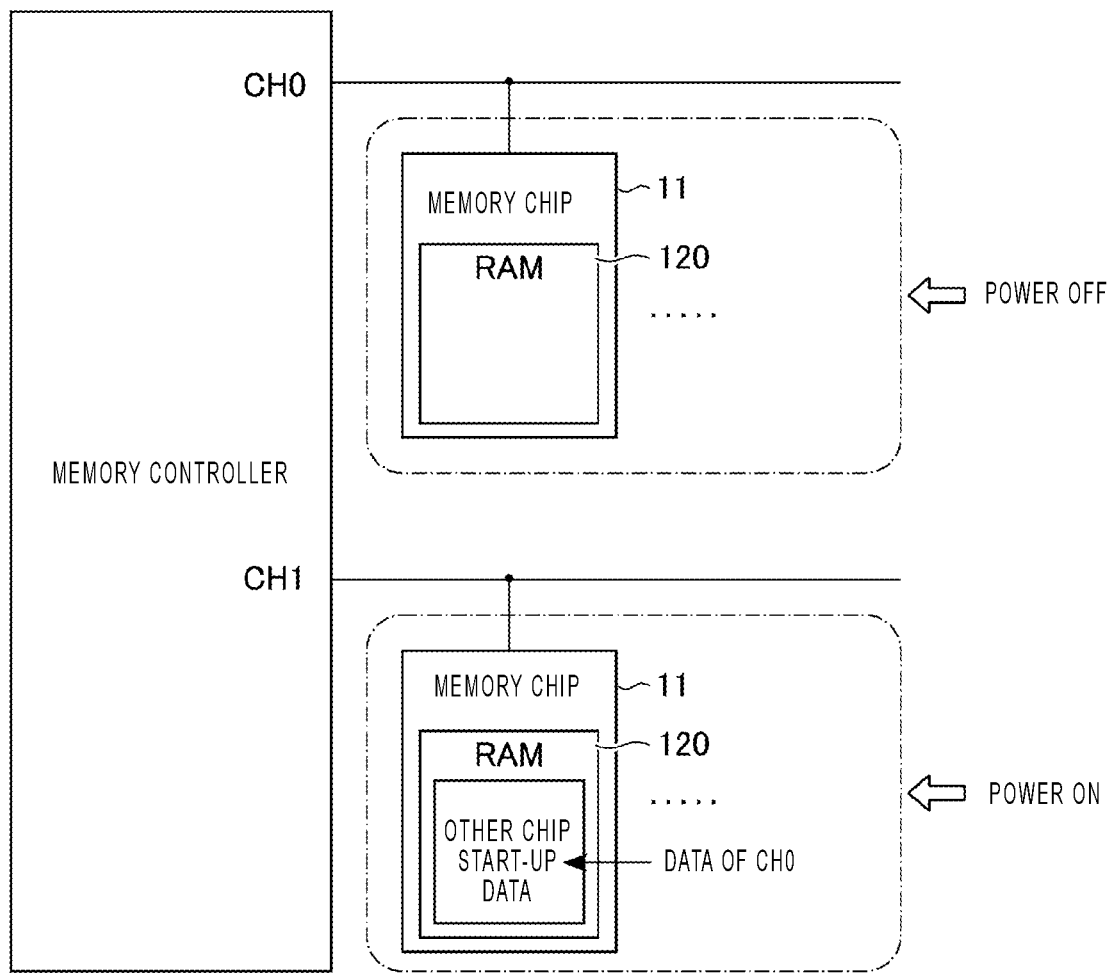
FIG. 16 is a diagram illustrating an example of on/off control of the memory chip in the memory system according to the first example of the second embodiment.

2.1.3. Example of on/Off Control of Memory Chip During Low Power Consumption Mode Next, referring to FIG. 16, an example of the on/off control of the memory chip 11 during the low power consumption mode will be described. FIG. 16 is a diagram illustrating an example of the on/off control of the memory chip 11.

As illustrated in FIG. 16, for example, the CPU 22 executes the on/off control of the memory chip 11 for each channel CH. In this case, the CPU 22 reads the chip start-up data of each memory chip 11 of the channel CH0 before turning off the power of the memory chip 11 of the channel CH0. In addition, the CPU 22 stores the chip start-up data in the RAM 120 of the memory chip 11 of the channel CH1 as the other chip start-up data. Thereafter, the CPU 22 turns off the power of the memory chip 11 of the channel CH0.

The CPU 22 reads the other chip start-up data from the memory chip 11 of the channel CH1 when turning on the power of the memory chip 11 of the channel CH0. Next, the CPU 22 transmits the corresponding chip start-up data to the memory chip 11 of the channel CH0. Thereafter, each memory chip 11 executes the power-on read operation during the low power consumption mode.

2.2. Second Example

Figure 17:
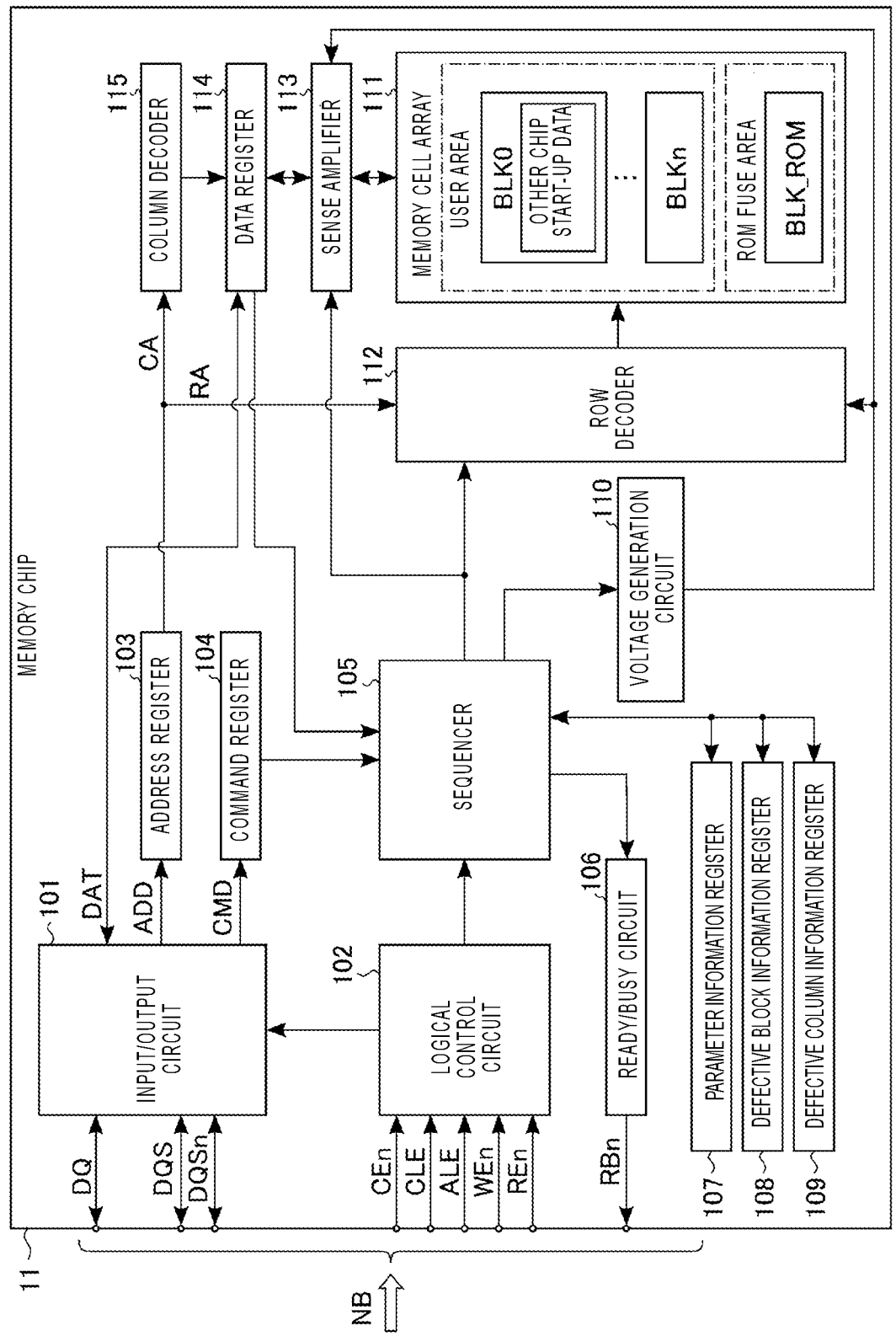
FIG. 17 is a block diagram illustrating a configuration of a memory chip provided in a memory system according to a second example of the second embodiment.

Next, a second example will be described. In the second example, referring to FIG. 17, a configuration of the memory chip 11 different from the first example is described. FIG. 17 is a block diagram illustrating the configuration of the memory chip 11 according to the second example. In the example illustrated in FIG. 17, a part of the connections among components are shown by arrow lines. However, the connections among the components are not limited thereto.

As illustrated in FIG. 17, the difference from the first example is that the other chip start-up data is stored in the block BLK of the user area instead of storing in the RAM 120 in the memory chip 11. In the example illustrated in FIG. 17, the other chip start-up data is stored in the block BLK0, but any one of the blocks BLK0 to BLKn for the user area may be used. Further, the memory cell transistor MC storing the chip start-up data is desirably the SLC for speed-up and reliability improvement of the data reading.

Other configurations and operations are the same as those of the first example.

2.3. Third Example

Figure 18:
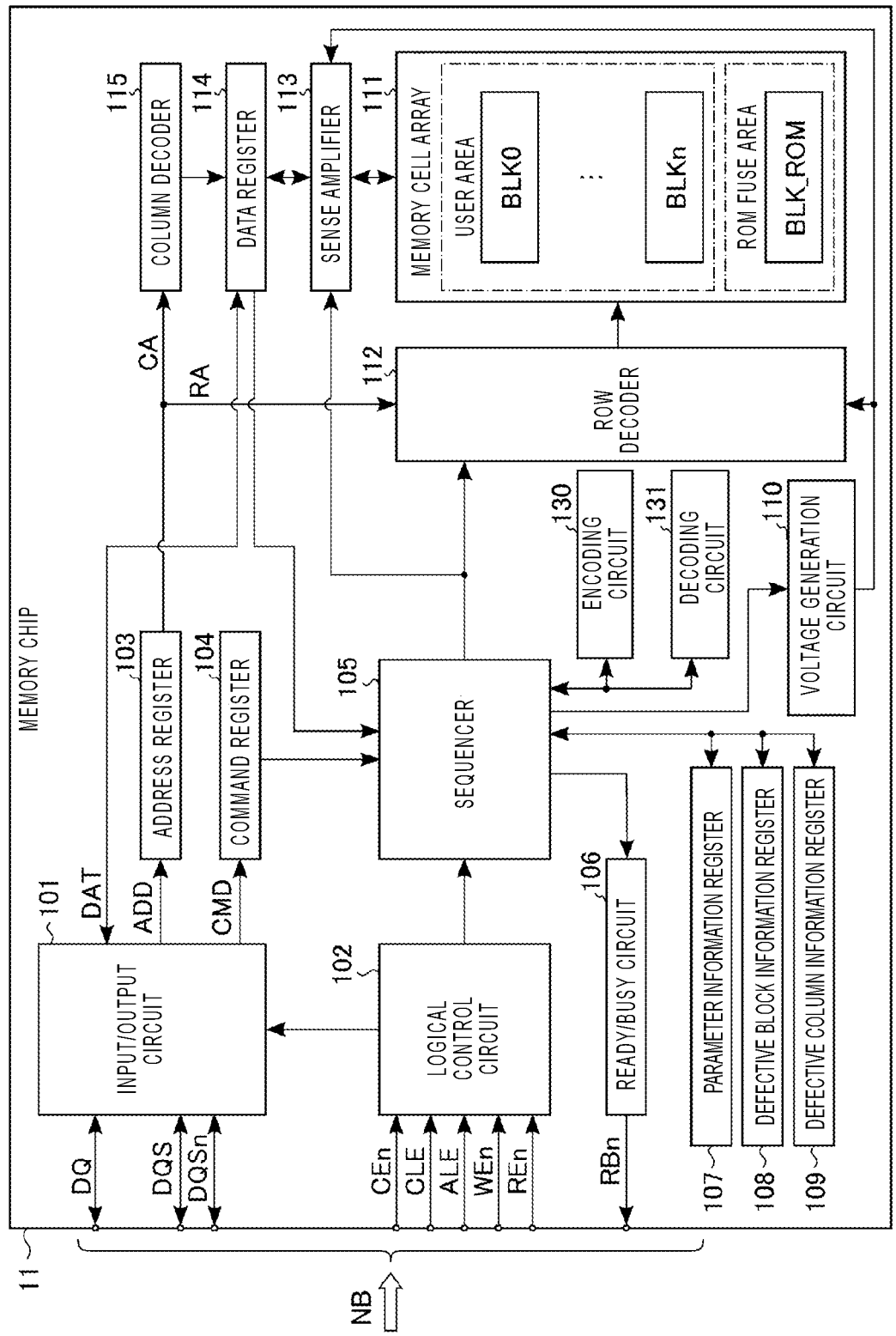
FIG. 18 is a block diagram illustrating a configuration of a memory chip provided in a memory system according to a third example of the second embodiment.

Next, a third example will be described. In the third example, referring to FIG. 18, a case of encoding the chip start-up data is described. FIG. 18 is a block diagram illustrating a configuration of the memory chip 11 according to the third example. In the example illustrated in FIG. 18, a part of connections among components are shown by arrow lines. However, the connections among the components are not limited thereto.

As illustrated in FIG. 18, the memory chip 11 of the third example includes an encoding circuit 130 and a decoding circuit 131. Other configurations are the same as those of the first embodiment.

The encoding circuit 130 executes encoding processing of the chip start-up data stored in the data register 114. For example, during the cache reading operation of the chip start-up data, the sequencer 105 transmits the encoded chip start-up data to the memory controller 20.

The decoding circuit 131 decodes (or restores) the encoded chip start-up data. For example, during the cache writing operation of the chip start-up data, the memory chip 11 receives the encoded chip start-up data from the memory controller 20. The sequencer 105 stores the chip start-up data decoded by the decoding circuit 131 in the data register 114.

2.4. Effect According to Second Embodiment

By the configuration according to the second embodiment, the same effect as the first embodiment may be obtained.

Further, by the configuration according to the first example or the second example of the second embodiment, the other chip start-up data may be stored in the memory chip 11. As a result, the memory capacity of the RAM 24 in the memory controller 20 may be reduced.

Further, by the configuration according to the third example of the second embodiment, the chip start-up data may be encoded. As a result, editing the chip start-up data by a user may be prevented. A malfunction of the memory chip 11 by the change of the chip start-up data may be prevented. Accordingly, the reliability of the memory chip 11 may be improved.

The first example or the second example, and the third example may be combined. That is, the encoded chip start-up data may also be stored in another memory chip 11.

3. Third Embodiment

Next, a third embodiment will be described. In the third embodiment, two examples are described for the configuration of the command sequence different from the first embodiment. Hereinafter, differences from the first embodiment will be primarily described.

3.1. First Example

Figure 19:
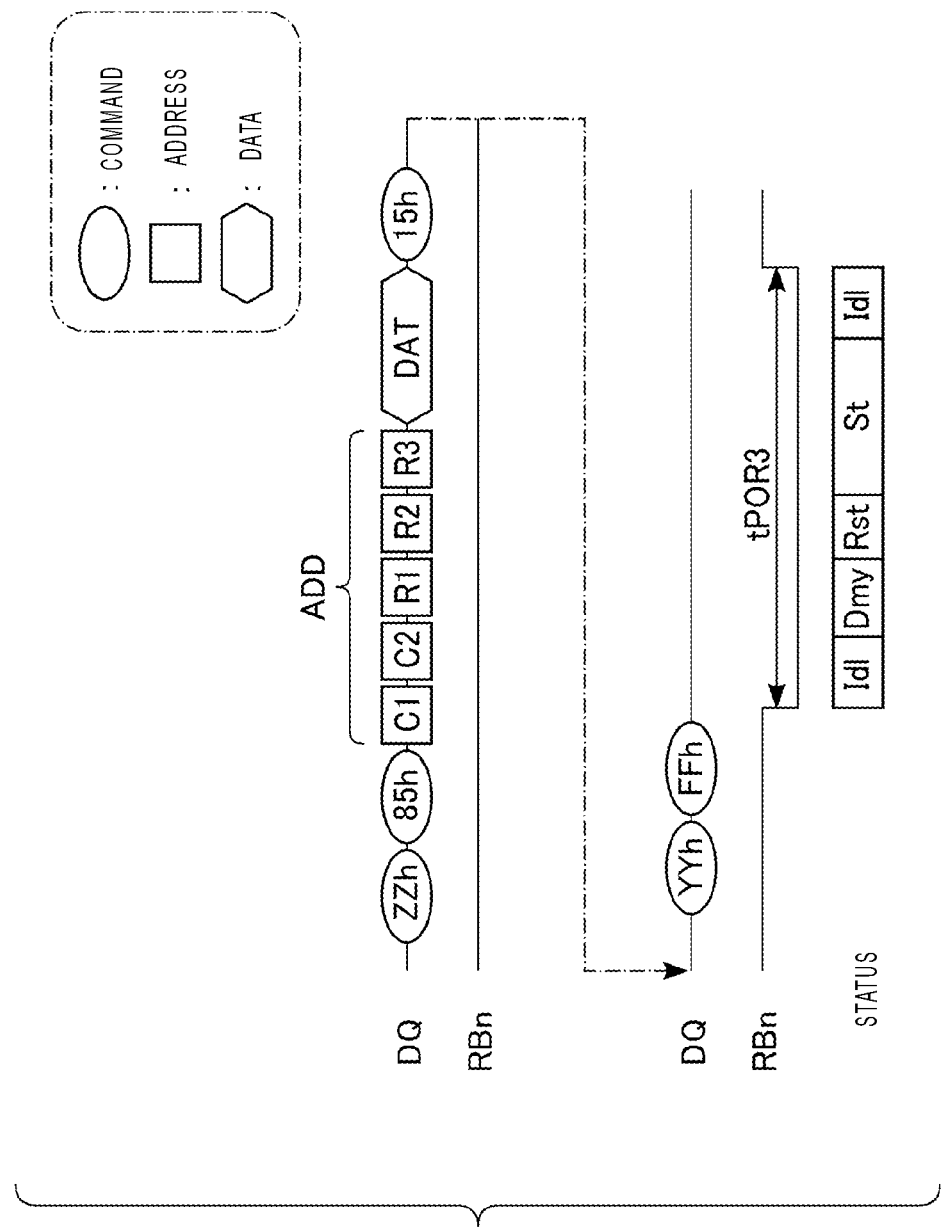
FIG. 19 is a diagram illustrating a command sequence of a cache writing operation and a setup operation in a memory system according to a first example of a third embodiment.

First, a first example is described. In the first example, referring to FIG. 19, a command sequence of the cache writing operation different from the first embodiment is described. FIG. 19 is a diagram illustrating the command sequence of the cache writing operation and the setup operation. In the example illustrated in FIG. 19, for simplification of description, the signal DQ and the signal RBn are illustrated, and the signals CEn, CLE, ALE, WEn, and REn are omitted.

As illustrated in FIG. 19, the CPU 22 transmits a command "ZZh" before transmitting a command "85h" during the cache writing operation. The command "ZZh" is a prefix command that indicates a parameter setting. For example, a parameter of the memory chip 11 before executing the cache writing operation of the chip start-up data is set to be a default value at the time of product shipment. For example, for speeding up a cache writing operation (a data input operation of inputting data into the memory chip 11) compared to the case of using the default value, the CPU 22 transmits the command "ZZh". As a result, the memory chip 11 executes an initial parameter setting required for speed-up. When the parameter of the default of the memory chip 11 is set because it is possible to speed up the cache writing operation, transmission of the command "ZZh" by the CPU 22 may be omitted. The sequencer 105 sets the parameter when receiving the command "ZZh". Transmission of the signal DQ after the command "85h" is the same as that of FIG. 9 of the first embodiment.

3.2. Second Example

Figure 20:
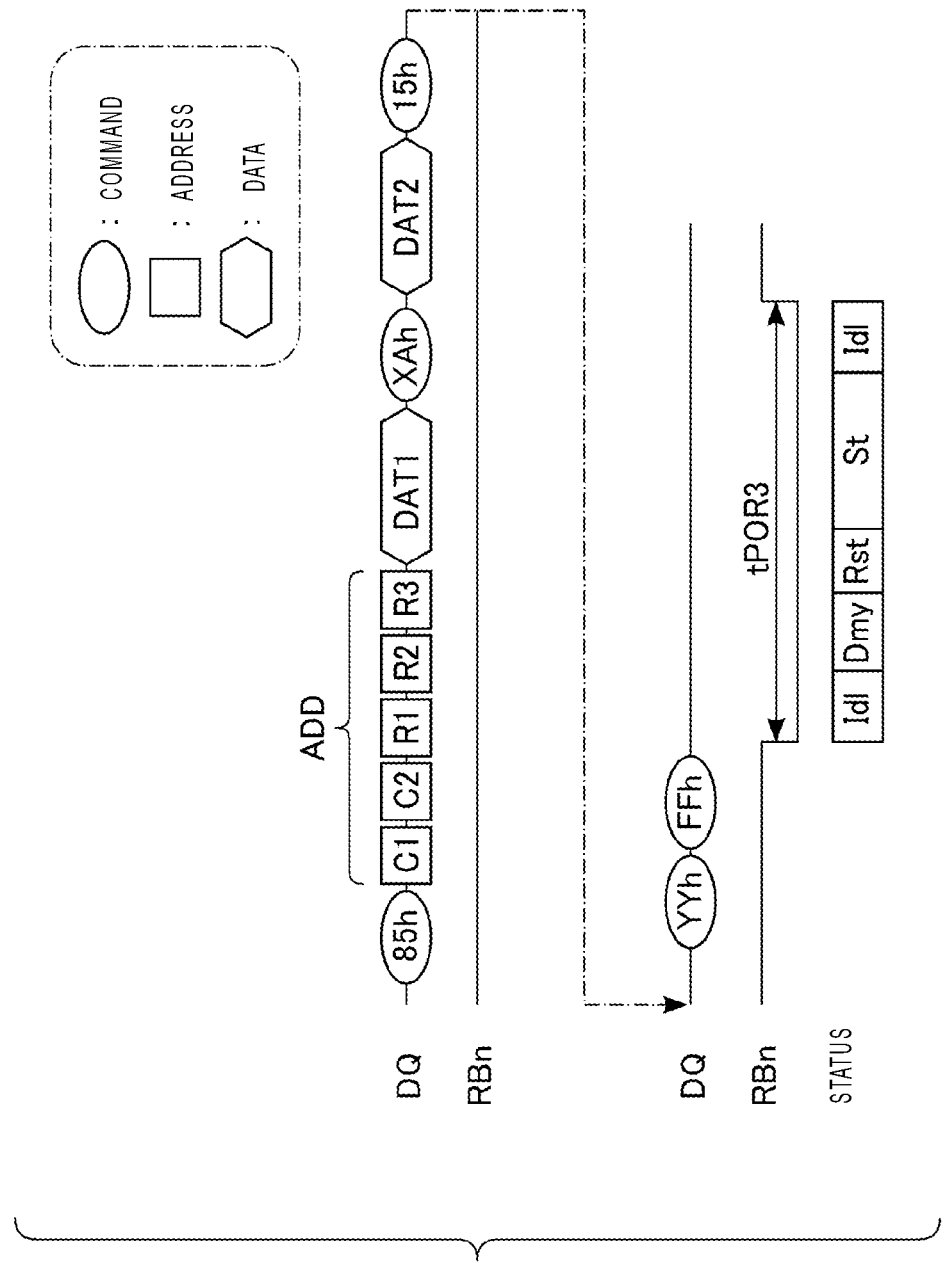
FIG. 20 is a diagram illustrating a command sequence of a cache writing operation and a setup operation in a memory system according to a second example of the third embodiment.

Next, a second example will be described. In the second example, referring to FIG. 20, a case of transmitting data several times during the cache writing operation is described. FIG. 20 is a diagram illustrating a command sequence of the cache writing operation and the setup operation. In the example illustrated in FIG. 20, for simplification of description, the signal DQ and the signal RBn are illustrated, and the signals CEn, CLE, ALE, WEn, and REn are omitted.

As illustrated in FIG. 20, the CPU 22 first transmits the command "85h" and the address ADD similarly to FIG. 9 during the cache writing operation. Next, the CPU 22 transmits first chip start-up data "DAT1" to the memory chip 11. Next, the CPU 22 transmits a command "XAh" to the memory chip 11. The command "XAh" is a command that instructs to transmit data in the latch circuit XDL to the latch circuit ADL of the sense amplifier 113 after executing the cache writing operation. When the sequencer 105 receives the command "XAh", the sequencer 105 transmits the first chip start-up data to the latch circuit ADL through the data register 114. Next, the CPU 22 transmits second chip start-up data "DAT2" to the memory chip 11 subsequently to the command "XAh". Next, the CPU 22 transmits a command "15h" to the memory chip 11. When the sequencer 105 receives the command "15h", the sequencer 105 stores the second chip start-up data in the data register 114 (e.g., latch circuit XDL). The power-on read operation during the low power consumption mode is the same as that of FIG. 9.

In the above example, the case of transmitting the chip start-up data twice is described, but the number of transmission times of the chip start-up data may be three times or more. For example, in the case of transmitting the chip start-up data three times, the memory chip 11 may store the chip start-up data in the latch circuits XDL, ADL, and BDL.

3.3. Effect According to Embodiment

By the configuration according to the third embodiment, the same effect as the first embodiment may be obtained.

Further, by the configuration according to the first example of the third embodiment, during the cache writing operation before executing the setup operation, the memory chip 11 may set the parameter. As a result, the malfunction by the using the setting of the default value may be prevented. Accordingly, the reliability of the memory system 3 may be improved.

Further, by the configuration according to the second example of the third embodiment, during the cache writing operation of the chip start-up data, the CPU 22 may transmit the chip start-up data several times. That is, when the chip start-up data is 1-page data or more, the chip start-up data may be transmitted in a plurality of times. As a result, a data mount of the chip start-up data may be increased as compared with the 1-page data. That is, it is easy to expand the size of the chip start-up data. In this case, in the power-on read operation during the low power consumption mode, the cell reading operation is omitted. As a result, the increase of the processing time of the power-on read operation and the increase of the maximum current consumption when executing the power-on read operation in the plurality of memory chips 11 may be prevented.

The first example and the second example of the third embodiment may be combined. Further, the first example or the second example of the third embodiment, and the second embodiment may be combined.

4. Fourth Embodiment

Next, a fourth embodiment will be described. In the fourth embodiment, in the power-on read operation during the low power consumption mode, two examples are described for a case of updating the chip start-up data. For example, it may be desirable to update the chip start-up data by a change in state of the memory chip 11 due to degradation of the memory cell transistors MC. In this case, the chip start-up data is updated. Hereinafter, differences from the first embodiment will be primarily described.

4.1. First Example

Figure 21:
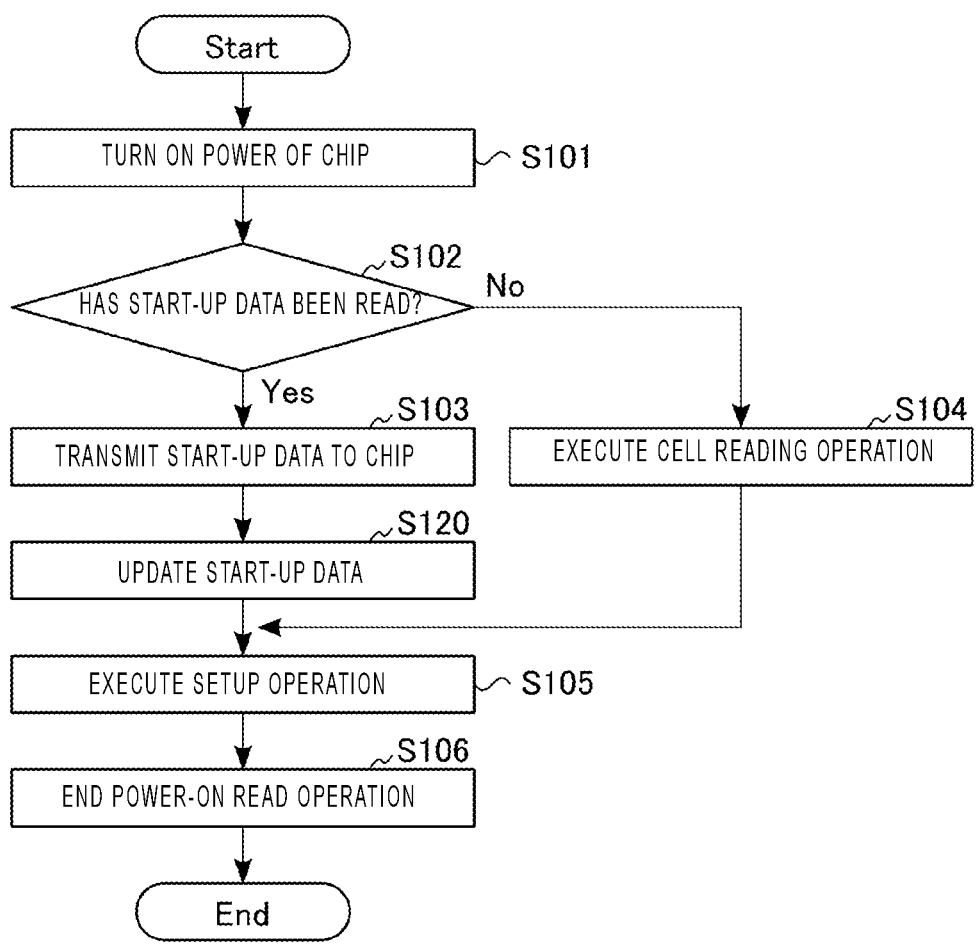
FIG. 21 is a flowchart illustrating a power-on read operation corresponding to a low power consumption mode in a memory system according to a first example of a fourth embodiment.

First, referring to FIG. 21, a first example is described. In the first example, a case of executing an overwriting operation of updated data for the chip start-up data stored in the data register 114 is described. FIG. 21 is a flowchart illustrating the power-on read operation during the low power consumption mode.

As illustrated in FIG. 21, the CPU 22 transmits the chip start-up data to the memory chip 11 in S103 similarly to FIG. 5. That is, the CPU 22 executes the cache writing operation of writing the chip start-up data. In addition, after S103, the CPU 22 executes the update of the chip start-up data stored in the data register 114 (S120). More specifically, the CPU 22 executes the cache writing operation of writing the updated data, i.e., the overwriting operation of writing the chip start-up data stored in the data register 114. Accordingly, in the flow illustrated in FIG. 21, a command set ("85h", address "ADD", chip start-up data "DAT", and "15h") for the cache writing operation of writing the chip start-up data and a command set ("85h", address "ADD", updated data "DAT", and "15h") for the cache writing operation of writing the updated data are transmitted to the memory chip 11 from the memory controller 20. A data length of the updated data is appropriately selected. The updated data may be a 1-page data or may be a data length shorter than the 1-page data. In other words, the data of the entire latch circuit XDL of the data register 114 may be updated, or data of a partial latch circuit XDL may be updated.

The processing after the data update (S120) is the same as that of FIG. 5 of the first embodiment.

4.2. Second Example

Figure 22:
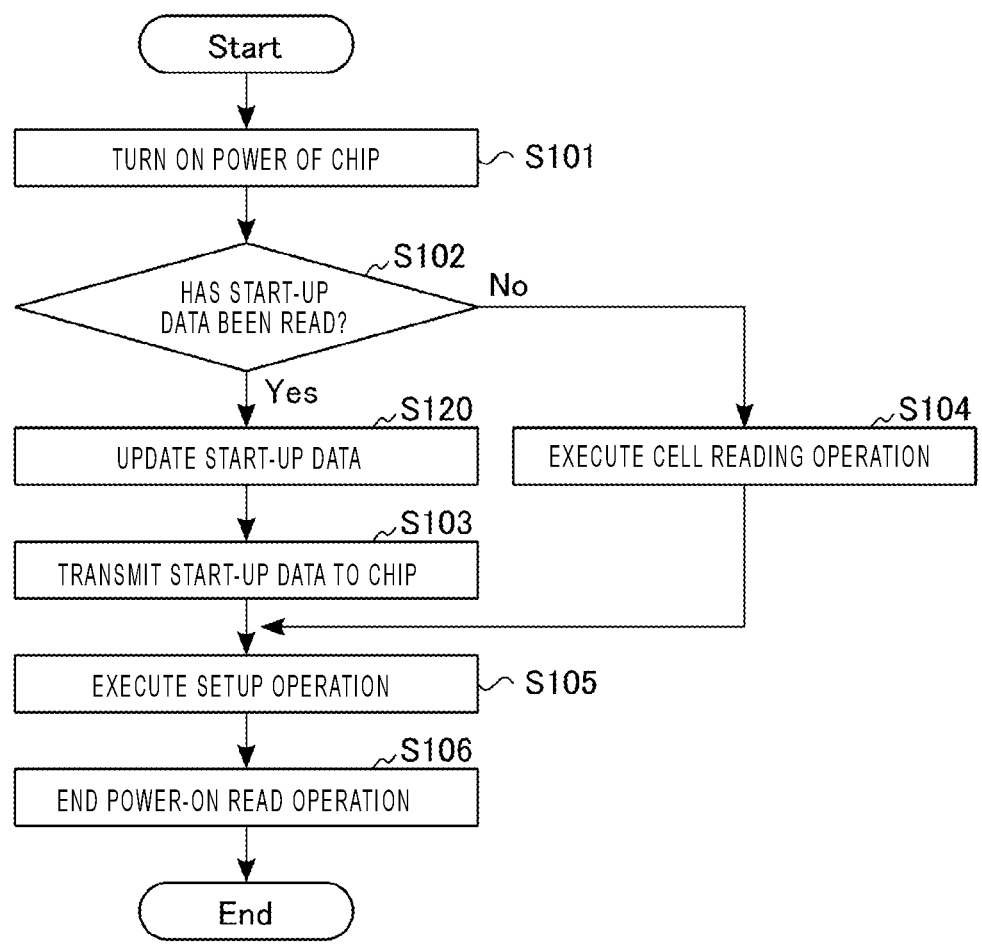
FIG. 22 is a flowchart illustrating a power-on read operation corresponding to a low power consumption mode in a memory system according to a second example of the fourth embodiment.

Next, referring to FIG. 22, a second example will be described. In the second example, for example, a case where the CPU 22 updates the chip start-up data stored in the RAM 24 and transmits the updated chip start-up data to the memory chip 11 is described. FIG. 22 is a flowchart illustrating the power-on read operation during the low power consumption mode.

As illustrated in FIG. 22, when reading the chip start-up data has been read in S102 (S102_Yes), the CPU 22 updates the chip start-up data stored in the RAM 24 (S120). The CPU 22 transmits the updated chip start-up data to the memory chip 11 in S103. Accordingly, in the flow illustrated in FIG. 22, the command set for the cache writing operation of wiring the updated chip start-up data is transmitted to the memory chip 11 from the memory controller 20. Other operations are the same as those of FIG. 5 of the first embodiment.

4.3. Effect According to Fourth Embodiment

By the configuration according to the fourth embodiment, the same effect as the first embodiment may be obtained.

Further, by the configuration according to the fourth embodiment, the CPU 22 may update the chip start-up data. As a result, the chip start-up data may be optimized. Accordingly, the reliability of the memory system 3 may be improved.

The fourth embodiment may also be applied to the second embodiment and the third embodiment.

5. Fifth Embodiment

Next, a fifth embodiment will be described. In the fifth embodiment, a case where the memory chip 11 is a NOR-type flash memory 700 is described. The NOR-type flash memory 700 is a non-volatile semiconductor memory device which is randomly accessible. Hereinafter, differences from the first embodiment will be primarily described.

5.1. Configuration of NOR-Type Flash Memory

Figure 23:
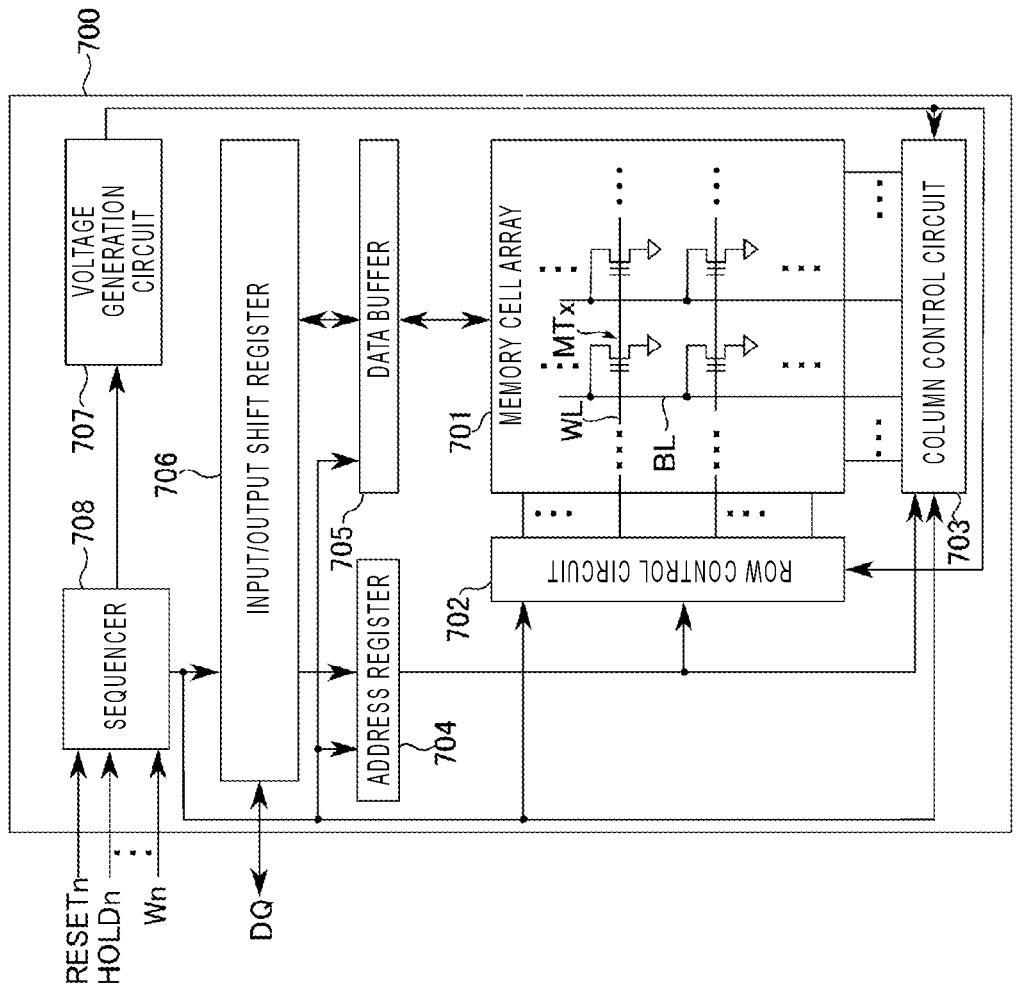
FIG. 23 is a block diagram illustrating a configuration of a NOR-type flash memory provided in a memory system according to a fifth embodiment.

Referring to FIG. 23, an example of the configuration of the-NOR type flash memory 700 will be described. FIG. 23 is a block diagram illustrating the configuration of the NOR-type flash memory 700.

As illustrated in FIG. 23, the NOR-type flash memory 700 includes a memory cell array 701, a row control circuit 702, a column control circuit 703, an address register 704, a data buffer 705, an input/output shift register 706, a voltage generation circuit 707, and a sequencer 708.

The memory cell array 701 includes a plurality of memory cells (memory cell transistors) MTx. In the NOR-type flash memory 700, the gate of each memory cell MTx is connected to one corresponding word line among a plurality of word lines WL. One end of a current path of each memory cell MTx is connected to one corresponding bit line among a plurality of bit lines BL. The other end of the current path of each memory cell MTx is connected to the source line, and, for example, grounded. The plurality of memory cells MTx is arranged in a 2D array shape or a 3D array shape.

The memory cell MTx is a field effect transistor with a stack gate structure having a charge storage layer. The charge storage layer may be a floating gate electrode or a charge trap film.

The row control circuit 702 selects a word line according to address information among the plurality of word lines WL. The row control circuit 702 applies predetermined voltage to the selected word line (and an unselected word line) according to a writing sequence, a reading sequence, and an erasing sequence.

The column control circuit 703 selects a bit line according to the address information among the plurality of bit lines BL. The row control circuit 702 applies predetermined voltage to the selected bit line (and an unselected bit line) according to the writing sequence, the reading sequence, and the erasing sequence.

The address register 704 temporarily stores the address information from the input/output shift register 706. The address register 704 sends the address information to the row control circuit 702 and the column control circuit 703.

The data buffer 705 temporarily stores read data from the memory cell array 701 and write data from the input/output shift register 706.

The input/output shift register 706 temporarily stores the signal DQ transmitted between the memory cell array 701 and the outside of the NOR type flash memory 700. The signal DQ may include the read data, the write data, and (or) the address information. The input/output shift register 706 transmits the address information to the address register 704. The input/output shift register 706 transmits the write data to the data buffer 705. The input/output shift register 706 transmits, to the memory controller 20, the read data supplied from the memory cell array 701. The input/output shift register 706 may perform parallel serial conversion of the signal DQ.

The voltage generation circuit 707 generates a plurality of voltages used for the writing sequence, the reading sequence, and the erasing sequence, respectively. The voltage generation circuit 707 supplies the generated voltages to the row control circuit 702 and the column control circuit 703.

The sequencer 708 controls an overall operation of the NOR-type flash memory 700 based on various control signals such as a reset signal RESETn, a hold signal HOLDn, and a write protect signal Wn.

The NOR-type flash memory 700 may include another component such as a status register, etc. The status register temporarily stores a status signal indicating an internal operation status of the NOR-type flash memory 700, and the execution result of the operation sequence.

5.2. Effect According to Fifth Embodiment

By the configuration according to the fifth embodiment, the same effect as the first embodiment may be obtained.

6. Modification, Etc

The memory system according to the above-described embodiments includes the memory chip 11 including the memory cell array 111 and the memory controller 20 controlling the memory chip. The memory cell array stores first data (i.e., chip start-up data) used in a first operation (i.e., POR) executed when the memory chip is started up. When the memory chip receives the first data from the memory controller, the memory chip does not read the first data from the memory cell array and when the memory chip does not receive the first data from the memory controller in the first operation, the memory chip reads the first data from the memory cell array in the first operation.

According to the embodiments, the memory system with improved processing capability may be provided.

The embodiments of the present disclosure are not limited to the above-described ones, but may be variously modified.

For example, in one of the above-described embodiments, the memory chip 11 may also include a plurality of memory cell arrays 111. In this case, for example, the memory chip 11 may include the memory cell array 111 allocated to the user area and the memory cell array 111 allocated to the ROM fuse area.

For example, instead of the encoding circuit 130 and the decoding circuit 131 described in the third example of the second embodiment, the memory chip 11 may include a compression circuit and an extension circuit. In this case, the compression circuit compresses the chip start-up data. In addition, the memory chip 11 transmits the compressed chip start-up data to the memory controller 20. Further, the extension circuit extends the chip start-up data received from the memory controller 20.

Further, in one of the above-described embodiments, the memory chip 11 may include an ECC circuit. In this case, the ECC circuit executes encoding processing and decoding processing of the chip start-up data.

Further, "connection" in the above-described embodiments also includes a state of indirect connection with another thing such as a transistor or a resistor interposed therebetween.

The above-described embodiments are examples and the scope of the present disclosure is not limited thereto.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system comprising:
a first memory chip, wherein the first memory chip includes a storage region that stores setup data used for setup of the first memory chip during power-on of the first memory chip, wherein the first memory chip includes a plurality of blocks for storing data, and the setup data includes defective block information indicating one or more defective blocks among the plurality of blocks of the first memory chip and includes no address of the storage region;
a second memory chip; and
a memory controller configured to:
determine whether or not the memory controller has the setup data, wherein the memory controller determines that the memory controller has the setup data when the setup data can be read from the second memory chip;
when determining that the memory controller does not have the setup data, instruct the first memory chip to read the setup data from the storage region of the first memory chip and perform a first setup operation using the setup data read from the storage region of the first memory chip;
when determining that the memory controller has the setup data, transmit the setup data from the memory controller to the first memory chip and instruct the first memory chip to perform a second setup operation using the setup data received from the memory controller; and
store the setup data received from the first memory chip in the second memory chip.

2. The memory system according to claim 1, wherein the memory controller does not instruct the first memory chip to read the setup data from the storage region of the first memory chip when the memory controller determines that the memory controller has the setup data.

3. The memory system according to claim 1, wherein the memory controller determines whether or not the memory controller has the setup data, when powering on the first memory chip.

4. The memory system according to claim 1, wherein the memory chip includes a register and is configured to store the setup data in the register during each of the first and second setup operations.

5. The memory system according to claim 1, wherein the memory controller includes a volatile memory and determines that the memory controller has the setup data when the volatile memory stores the setup data.

6. The memory system according to claim 1, wherein the memory controller is further configured to instruct the first memory chip to read the setup data from the storage region of the first memory chip and transmit the read setup data to the memory controller.

7. The memory system according to claim 6, wherein the memory controller is further configured to power off the first memory chip upon reception of the setup data from the first memory chip.

8. The memory system according to claim 6, wherein the memory controller includes a volatile memory and is configured to store the setup data received from the first memory chip in the volatile memory.

9. The memory system according to claim 1, wherein
the first memory chip includes a memory cell array having a user data region in which user data is stored, and
the storage region is included in the memory cell array separately from the user data region.

10. The memory system according to claim 1, wherein the memory controller is further configured to transmit second setup data used for setup of the second memory chip during power-on of the first memory chip to the first memory chip and instruct the first memory chip to store the second setup data.

11. The memory system according to claim 1, wherein
the setup data transmitted from the memory controller to the first memory chip is encoded, and
the first memory chip includes a decoding circuit configured to decode the encoded setup data received from the memory controller.

12. The memory system according to claim 11, wherein the first memory chip further includes an encoding circuit configured to encode the setup data read from the storage region of the first memory chip.

13. The memory system according to claim 1, wherein the memory controller is further configured to transmit updated setup data to the first memory chip, and instruct the first memory chip to perform the setup operation using the updated setup data received from the memory controller.

14. The memory system according to claim 1, wherein the memory controller is further configured to update the setup data that the memory controller has, to updated setup data, and transmit the updated setup data to the first memory chip, instead of the setup data.

15. A memory system comprising:
a plurality of memory chips, wherein each individual memory chip of the plurality of memory chips includes a storage region that stores setup data used for setup of the individual memory chip during power-on of the individual memory chip, wherein each individual memory chip of the plurality of memory chips includes a plurality of blocks for storing data, and the setup data stored in the individual memory chip of the plurality of memory chips includes defective block information indicating one or more defective blocks among the plurality of blocks of the individual memory chip of the plurality of memory chips and includes no address of the storage region of the individual memory chip; and
a memory controller configured to, with respect to each individual memory chip of the plurality of memory chips:
determine whether or not the memory controller has the setup data;
when determining that the memory controller does not have the setup data, instruct the individual memory chip of the plurality of memory chips to read the setup data from the storage region of the individual memory chip of the plurality of memory chips and perform a first setup operation using the setup data read from the storage region of the individual memory chip of the plurality of memory chips; and
when determining that the memory controller has the setup data, transmit the setup data from the memory controller to the individual memory chip of the plurality of memory chips and instruct the individual memory chip of the plurality of memory chips to perform a second setup operation using the setup data received from the memory controller, wherein
when the memory controller determines that the memory controller has the setup data for a first one of the plurality of memory chips and the setup data for a second one of the plurality of memory chips, the memory controller instructs the first and second ones of the plurality of memory chips to concurrently perform the second setup operation, and
timing when the first one of the plurality of memory chips performs the second setup operation is shifted with respect to timing when the second one of the plurality of memory chips performs the second setup operation.

16. The memory system according to claim 15, wherein when the memory controller determines that the memory controller does not have the setup data for the first one of the plurality of memory chips and for the second one of the plurality of memory chips, the memory controller instructs the first and second ones of the plurality of memory chips to concurrently perform the first setup operation, and
timing when the first one of the plurality of memory chips performs the first setup operation is shifted with respect to timing when the second one of the plurality of memory chips performs the first setup operation.

17. The memory system according to claim 16, wherein each individual memory chip of the plurality of memory chips includes a terminal from which a power voltage of the individual memory chip is supplied, and
a maximum of a total current that flows through the terminals of the first and second ones of the plurality of memory chips during the concurrently-performed second setup operation is less than a maximum of a total current that flows through the terminals of the first and second ones of the plurality of memory chips during the concurrently-performed first setup operation.

* * * * *